US010383117B2

(12) United States Patent
Yoon

(10) Patent No.: US 10,383,117 B2
(45) Date of Patent: Aug. 13, 2019

(54) METHOD AND APPARATUS FOR DETERMINING RESOURCE POOL

(71) Applicant: Innovative Technology Lab Co., Ltd., Seoul (KR)

(72) Inventor: Sung Jun Yoon, Seoul (KR)

(73) Assignee: INNOVATIVE TECHNOLOGY LAB Co., Ltd., Seoul (KR)

( * ) Notice: Subject to any disclaimer, the term of this patent is extended or adjusted under 35 U.S.C. 154(b) by 0 days.

(21) Appl. No.: 15/719,905

(22) Filed: Sep. 29, 2017

(65) Prior Publication Data

US 2018/0098322 A1    Apr. 5, 2018

(30) Foreign Application Priority Data

Sep. 30, 2016 (KR) .................. 10-2016-0126853
Oct. 21, 2016 (KR) .................. 10-2016-0137463

(51) Int. Cl.
*H04W 72/04* (2009.01)
*H04L 5/14* (2006.01)
*H04W 56/00* (2009.01)
*H04W 76/14* (2018.01)

(52) U.S. Cl.
CPC .......... *H04W 72/0446* (2013.01); *H04L 5/14* (2013.01); *H04W 56/0005* (2013.01); *H04W 72/042* (2013.01); *H04W 76/14* (2018.02)

(58) Field of Classification Search
None
See application file for complete search history.

(56) References Cited

U.S. PATENT DOCUMENTS

| 2016/0021625 | A1* | 1/2016 | Li | H04W 72/1289 370/336 |
| 2016/0295499 | A1* | 10/2016 | Tavildar | H04W 48/12 |
| 2016/0338055 | A1* | 11/2016 | Yang | H04W 8/005 |
| 2018/0049235 | A1* | 2/2018 | Baghel | H04W 4/70 |

OTHER PUBLICATIONS

"3rd Generation Partnership Project; Technical Specification Group Radio Access Network; Evolved Universal Terrestrial Radio Access (E-UTRA); Physical layer procedures (Release 14)," 3GPP TS 36.213 V14.0.0, Sep. 2016, pp. 1-404, 3GPP.

* cited by examiner

*Primary Examiner* — Candal Elpenord

(57) ABSTRACT

A method includes receiving, at a mobile device, resource pool configuration information, the resource pool configuration information comprising a bitmap to determine the resource pool and determining, for a period having a plurality of consecutive subframes, a first subset of subframes by excluding, from the plurality of consecutive subframes, subframes in which a sidelink synchronization signal (SLSS) resource is configured and subframes other than uplink subframes. The method also includes determining, for the period, a second subset of subframes by excluding, from the first subset of subframes, one or more subframes, wherein a quantity of the second subset of subframes corresponds to an integer multiple of a length of the bitmap, and determining, based on a plurality of repetitions of the bitmap, the resource pool for a sidelink transmission from the second subset of subframes.

20 Claims, 14 Drawing Sheets

V2V OPERATION

V2I OPERATION

V2P OPERATION

V2V OPERATION

V2I OPERATION

V2P OPERATION

METHOD AND APPARATUS FOR DETERMINING RESOURCE POOL

CROSS-REFERENCE TO RELATED APPLICATIONS

This application claims priority from and the benefit of Korean Patent Application Nos. 10-2016-0126853, filed on Sep. 30, 2016, and 10-2016-0137463, filed on Oct. 21, 2016, which are hereby incorporated by reference in their entirety.

BACKGROUND

1. Field

The present disclosure relates to a wireless communication system, and more particularly, to a method and apparatus for determining a resource pool for vehicle-to-X (V2X) communication.

2. Discussion of the Background

The term Vehicle-to-X (V2X: vehicle-to-everything) communication refers to a communication scheme that exchanges or shares information (e.g., traffic conditions or the like) through communication with roadway infrastructures and other vehicles during driving.

Control information, such as scheduling assignment (SA), needs to be transmitted from a transmission user equipment (Tx UE) to a reception UE (Rx UE) for V2X communication, and data may be transmitted/received based on the control information. A set of resource candidates to be used for the transmission of control information and data for V2X may be defined; this set is referred to as a resource pool. The resource pool for V2X communication may be defined in the time domain and in the frequency domain. The time-domain resource pool for V2X communication may be defined in units of subframes. However, there is an ever-present need for a detailed scheme for determining the time-domain resource pool for V2X communication.

SUMMARY

The present disclosure provides a method and apparatus for determining a resource pool for V2X communication.

The present disclosure provides a method and apparatus for determining a subframe pool for V2X communication.

The present disclosure provides a method and apparatus for determining a subframe pool for V2X communication using a bitmap which is repeated integer-multiple times within a predetermined period.

A method may include receiving, at a mobile device, resource pool configuration information, the resource pool configuration information comprising a bitmap to determine the resource pool and determining, for a period having a plurality of consecutive subframes, a first subset of subframes by excluding, from the plurality of consecutive subframes, subframes in which a sidelink synchronization signal (SLSS) resource is configured and subframes other than uplink subframes. The method also includes determining, for the period, a second subset of subframes by excluding, from the first subset of subframes, one or more subframes, wherein a quantity of the second subset of subframes corresponds to an integer multiple of a length of the bitmap, and determining, based on a plurality of repetitions of the bitmap, the resource pool for a sidelink transmission from the second subset of subframes.

According to the present disclosure, there is provided a method and apparatus for determining a subframe pool for V2X communication such that control information and data are efficiently transmitted, while avoiding collision with other transmissions.

DETAILED DESCRIPTION OF THE ILLUSTRATED EMBODIMENTS

Figure 1A:
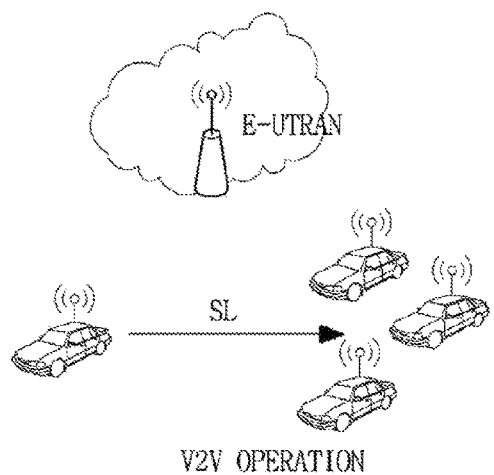
FIGS. 1A, 1B, 1C, 2A, 2B, 2C, 3A, and 3B are diagrams illustrating a V2X scenario.

Exemplary embodiments of the present invention will be described more fully hereinafter with reference to the accompanying drawings, in which exemplary embodiments of the invention are shown. Throughout the drawings and the detailed description, unless otherwise noted, the same drawing reference numerals are understood to refer to the same elements, features, and structures. In describing the exemplary embodiments, detailed description of known configurations or functions may be omitted for clarity and conciseness.

The description herein is related to a wireless communication network. An operation completed in a wireless communication network may be performed through a process of controlling a network and transmitting data through a system that controls the wireless communication network (e.g., a base station [BS]), or may be performed in a user equipment (UE) connected to the wireless communication network.

That is, it is apparent that various operations may be performed for communicating with a terminal in a network composed of a plurality of network nodes including a base station (B S); these operations are executable by the BS or by other network nodes excluding the BS. 'Base station' may be replaced with terms such as a fixed station, a Node B, an evolved Node B (eNB), an access point (AP), and the like. Also, 'terminal' may be replaced with terms such as a User Equipment (UE), a Mobile Station (MS), a Mobile Subscriber Station (MSS), a Subscriber Station (SS), a non-AP station (non-AP STA), and the like.

While the present invention has been shown and described in connection with the embodiments, it will be apparent to those skilled in the art that modifications and variations can be made without departing from the spirit and scope of the invention as defined by the appended claims. Thus, the present invention is not limited to the embodiments herein and may include all embodiments within the scope of the appended claims. For example, various exemplary embodiments will be described with respect to 3GPP LTE or LTE-A systems; however, aspects of the illustrated embodiments may be applied to other mobile communication systems.

Terminologies and abbreviations used in the present disclosure are defined as provided below.

D2D: Device to Device (communication)
ProSe: (Device to Device) Proximity Services
SL: Sidelink
SCI: Sidelink Control Information
PSSCH: Physical Sidelink Shared Channel
PSBCH: Physical Sidelink Broadcast Channel
PSCCH: Physical Sidelink Control Channel
PSDCH: Physical Sidelink Discovery Channel
SLSS: Sidelink Synchronization Signal (=D2DSS (D2D Synchronization Signal))
SA: Scheduling Assignment
TB: Transport Block
TTI: Transmission Time Interval
RB: Resource Block In V2X communication, control information transmitted from a user equipment (UE) to another UE may be referred to as scheduling assignment (SA). When a sidelink (SL) is used as a communication link between UEs, the control information may be referred to as sidelink control information (SCI); in this case, the control information may be transmitted through a PSCCH.

In V2X communication, data that a UE transmits to another UE may be configured in units of TBs; in this case, the data may be transmitted through a PSSCH.

The present disclosure also defines an operation mode according to a resource assignment scheme for transmitting control information and data for V2X communication or for direct link (e.g., D2D, ProSe, or SL) communication.

An eNodeB resource scheduling mode is a mode in which an eNodeB or a relay node schedules resources that a UE uses for transmitting V2X (or direct link) control information and/or data, and the UE transmits the V2X (or direct link) control information and/or data through the scheduled resources. For example, the eNodeB or relay node provides scheduling information associated with resources for V2X (or direct link) transmission control information and/or data to a V2X (or direct link) Tx UE through Downlink Control Information (DCI). Accordingly, the V2X (or direct link) Tx UE transmits the V2X (or direct link) control information and data to a V2X (or direct link) Rx UE; the V2X (or direct link) Rx UE may then receive V2X (or direct link) data based on the V2X (or direct link) control information.

A UE autonomous resource selection mode is a mode in which a UE autonomously selects resources to be used for transmitting control information and data, then transmits the control information and data. Here, the resource is selected from a resource pool (i.e., a set of resource candidates) through sensing or the like. For example, the V2X (or direct link) Tx UE transmits the V2X (or direct link) control information and data to a V2X (or direct link) Rx UE, and the V2X (or direct link) Rx UE may receive V2X (or direct link) data based on the V2X (or direct link) control information.

For the following examples, the eNodeB resource scheduling mode may be referred to as mode 1 in direct link communication, and may be referred to as mode 3 in V2X communication. The UE autonomous resource selection mode may be referred to as mode 2 in direct link communication, and may be referred to as mode 4 in V2X communication.

Hereinafter, although embodiments of the present disclosure are described from the perspective of V2X communication, the scope of the present disclosure is not limited to V2X communication. Rather, the embodiments may also be applied to direct link-based communication, such as D2D, ProSe, SL communication, or the like.

V2X is a term that generally indicates V2V, V2P, and V2I/N. When used in association with LTE communication, V2V, V2P, and V2I/N may be defined as shown in Table 1.

TABLE 1

| | |
|---|---|
| V2V | covering LTE-based communication between vehicles |
| V2P | covering LTE-based communication between a vehicle and a device carried by an individual (e.g., handheld terminal carried by a pedestrian, cyclist, driver or passenger) |
| V2I/N | covering LTE-based communication between a vehicle and a roadside unit/network |

A roadside unit (RSU) is a stationary infrastructure entity supporting V2X applications that can exchange messages with other entities supporting V2X applications.
Note:
RSU is a term frequently used in existing ITS specifications, and the reason for introducing the term in 3GPP specifications is to make the documents easier to read for the ITS industry. RSU is a logical entity that combines V2X application logic with the functionality of an eNB (referred to as eNB-type RSU) or a UE (referred to as UE-type RSU).

Figure 2A:
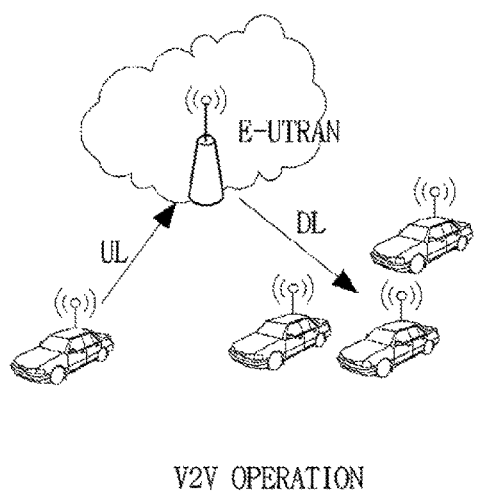
Figure 2B:
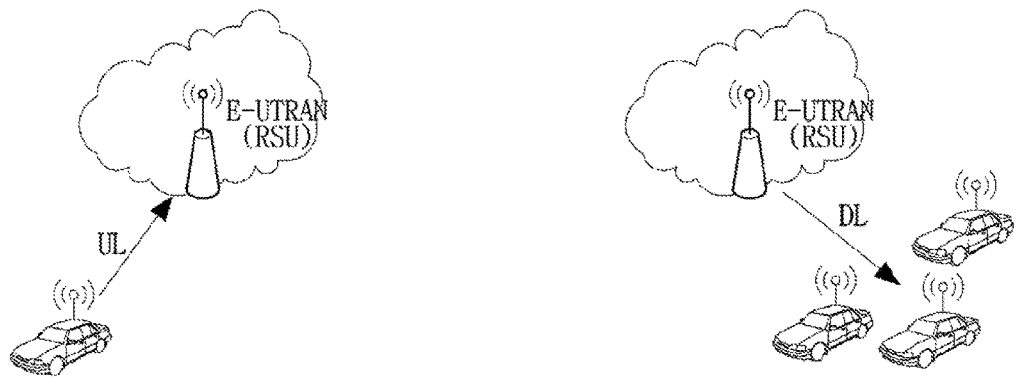
Figure 2C:
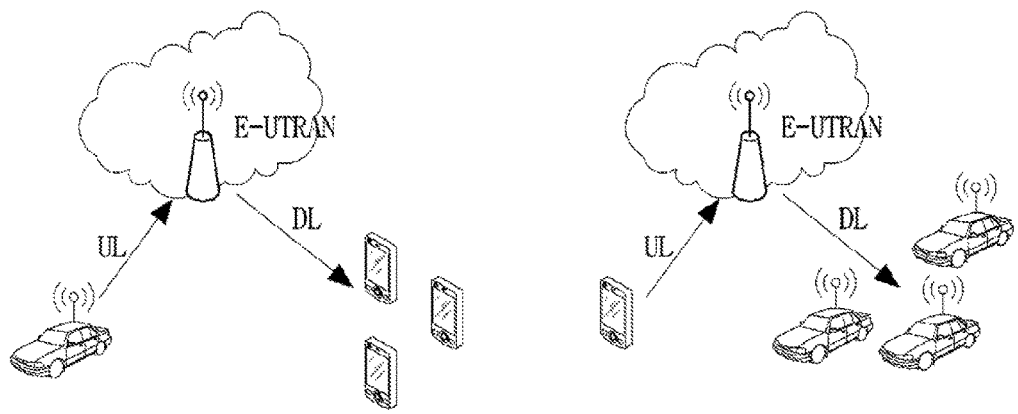
Figure 3A:
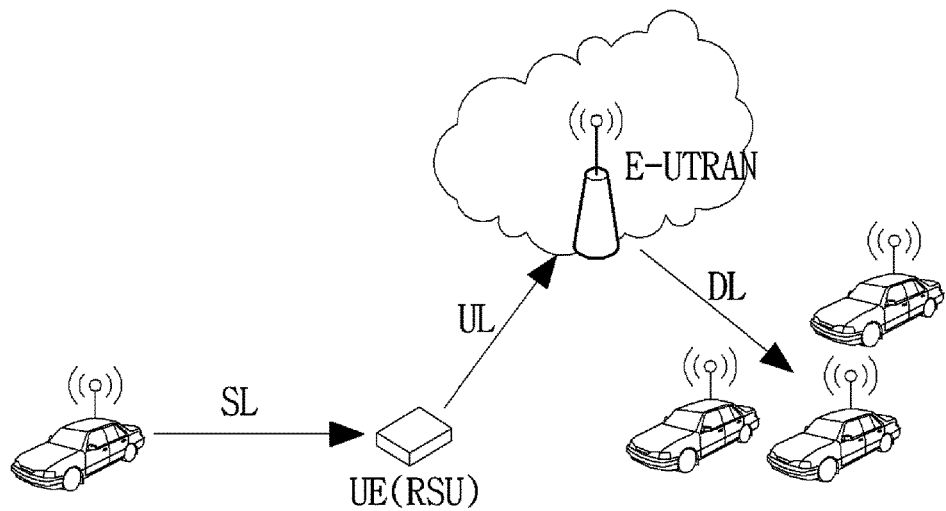
Figure 3B:
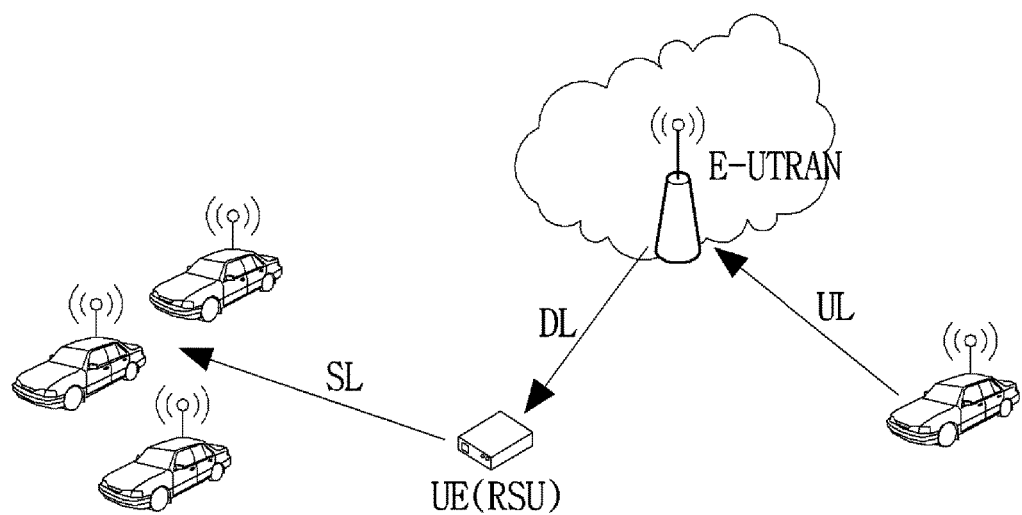

V2X communication may include communication based on PC5, which is a D2D communication link (i.e., a direct interface between two devices supporting ProSe). For V2X operation, various scenarios described in Table 2, Table 3, and Table 4 are taken into consideration with reference to FIGS. 1A, 1B, 1C, 2A, 2B, 2C, 3A, and 3B. Hereinafter, FIGS. 1A-C may be collectively referred to as FIG. 1. FIGS. 2A-C may be collectively referred to as FIG. 2. FIGS. 3A and 3B may be collectively referred to as FIG. 3.

FIGS. 1, 2, and 3 are diagrams illustrating a V2X scenario.

Figure 1B:
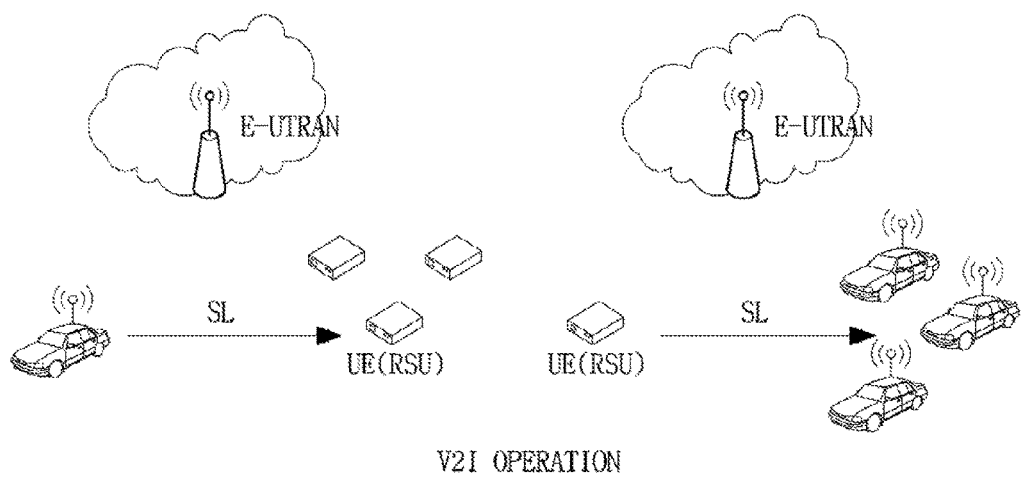
Figure 1C:
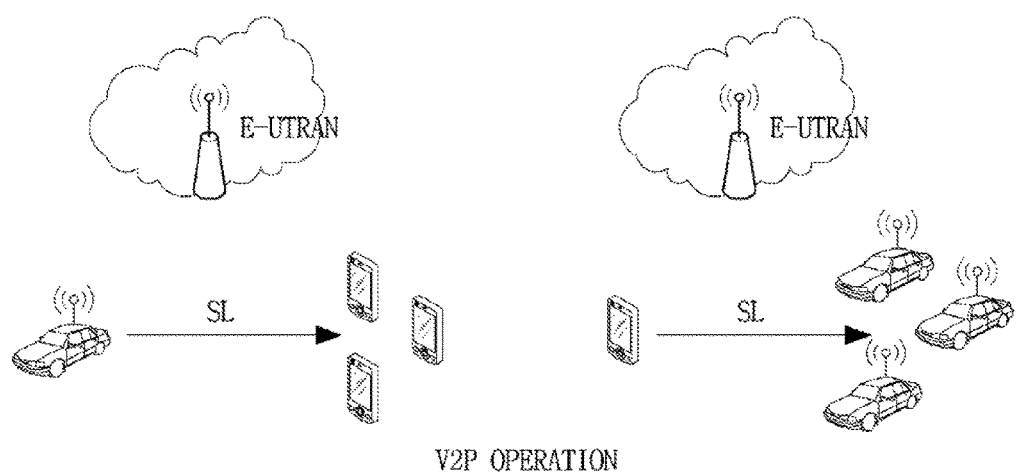

Table 2 and FIG. 1 illustrate a scenario that supports a V2X operation based only on a PC5 interface (i.e., an SL interface or D2D interface). FIG. 1A illustrates a V2V operation. FIG. 1B illustrates a V2I operation. FIG. 1C illustrates a V2P operation.

TABLE 2

This scenario supports V2X operation based only on PC5.
In this scenario, a UE transmits a V2X message to multiple UEs in a local area using a sidelink.
For V2I, either the transmitter UE or the receiver UE(s) is a UE-type RSU.
For V2P, either the transmitter UE or the receiver UE(s) is a pedestrian UE.

Table 3 and FIG. 2 illustrate a scenario that supports a V2X operation based only on a Uu interface (i.e., an interface between a UE and an eNodeB). FIG. 2A illustrates a V2V operation. FIG. 2B illustrates a V2I operation. FIG. 2C illustrates a V2P operation.

TABLE 3

This scenario supports V2X operation based only on Uu.
In this scenario,
    For V2V and V2P, a UE transmits a V2X message to E-UTRAN in the uplink and E-UTRAN transmits it to multiple UEs in a local area in the downlink.
    For V2I, when the receiver is an eNB-type RSU, a UE transmits a V2I message to E-UTRAN (eNB-type RSU) in the uplink; when the transmitter is an eNB-type RSU, E-UTRAN (eNB-type RSU) transmits an I2V message to multiple UEs in a local area in the downlink.
    For V2P, either the transmitter UE or the receiver UE(s) is a pedestrian UE.
To support this scenario, E-UTRAN performs the uplink reception and downlink transmission of V2X messages. For a downlink, E-UTRAN may use a broadcast mechanism.

Table 4 and FIG. 3 illustrate a scenario that supports a V2X operation that uses both a Uu interface and a PC5 interface (i.e., an SL interface or a D2D interface). FIG. 3A illustrates scenario 3A from Table 4 and FIG. 3B illustrates scenario 3B from Table 4.

TABLE 4

This scenario supports V2V operation using both Uu and PC5.

Scenario 3A   In this scenario, a UE transmits a V2X message to other UEs in a sidelink. One of the receiving UEs is a UE-type RSU which receives the V2X message in a sidelink and transmits it to E-UTRAN in an uplink. E-UTRAN receives the V2X message from the UE-type RSU and then transmits it to multiple UEs in a local area in a downlink. To support this scenario, E-UTRAN performs uplink reception and downlink transmission of V2X messages. For the downlink, E-UTRAN may use a broadcast mechanism.

Scenario 3B   In this scenario, a UE transmits a V2X message to E-UTRAN in an uplink and E-UTRAN transmits it to one or more UE-type RSUs. Then, the UE-type RSU transmits the V2X message to other UEs in a sidelink. To support this scenario, E-UTRAN performs uplink reception and downlink transmission of V2X messages. For the downlink, E-UTRAN may use a broadcast mechanism.

Figure 4:
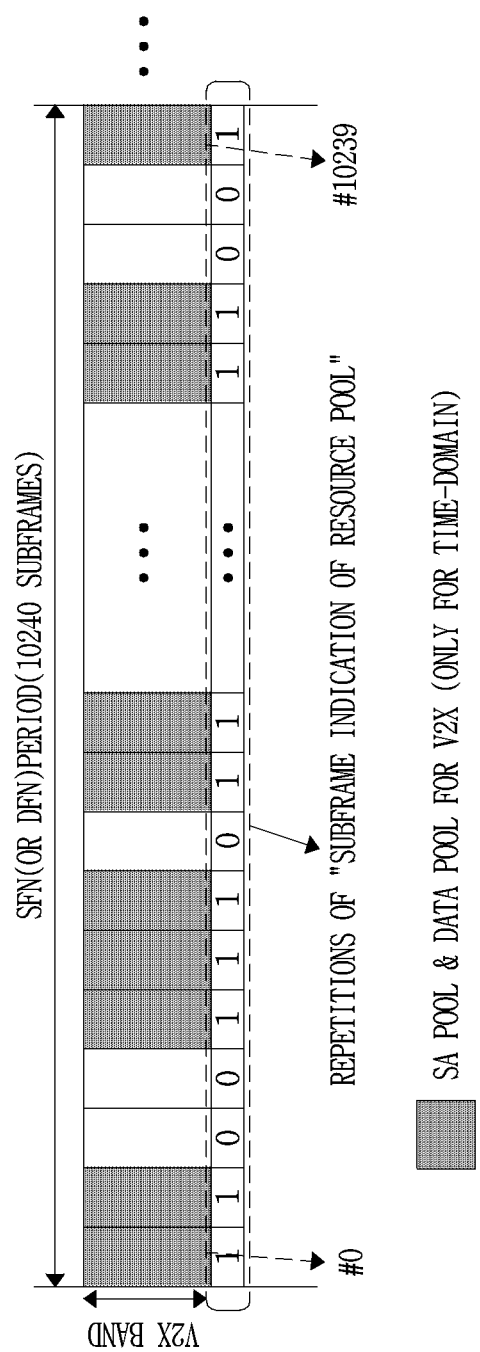
FIGS. 4 and 5 are diagrams illustrating an example of a resource pool from the perspective of the time domain.
Figure 5:
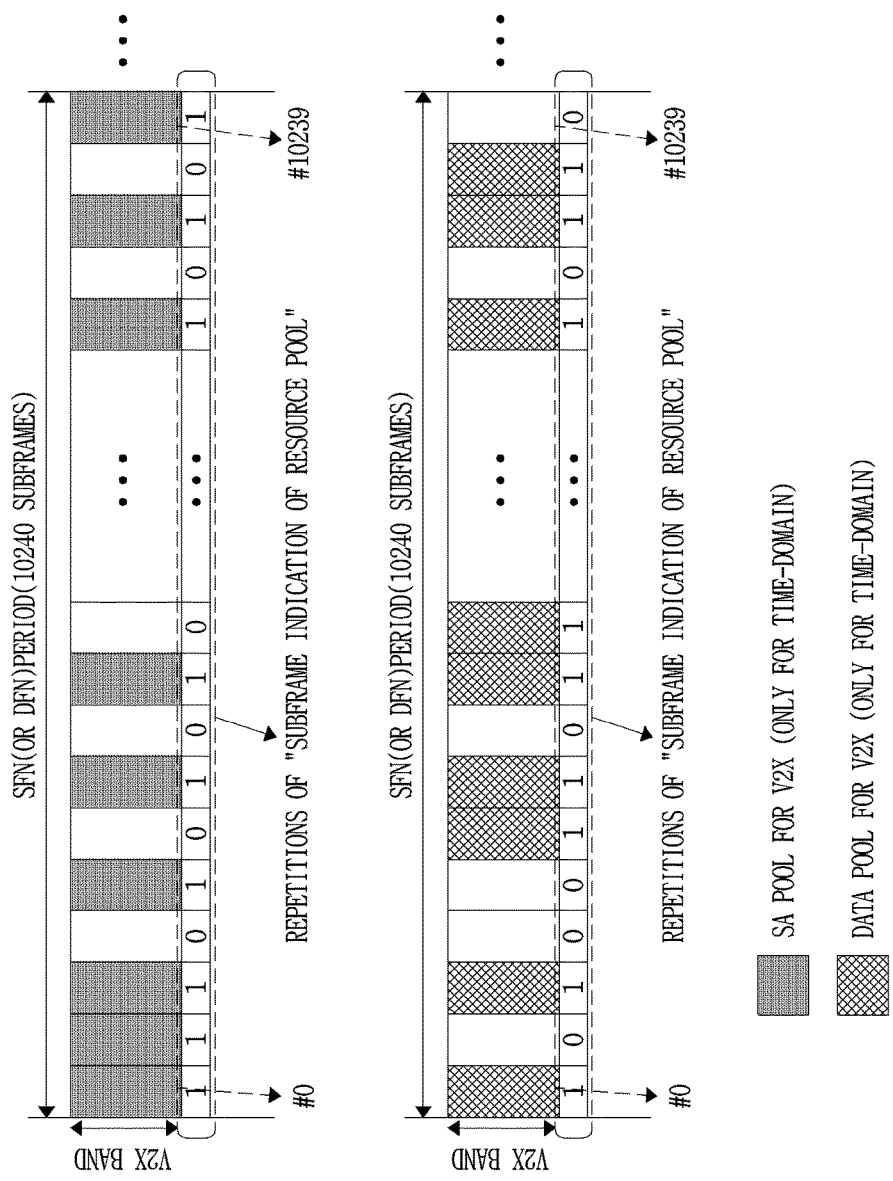
Figure 6:
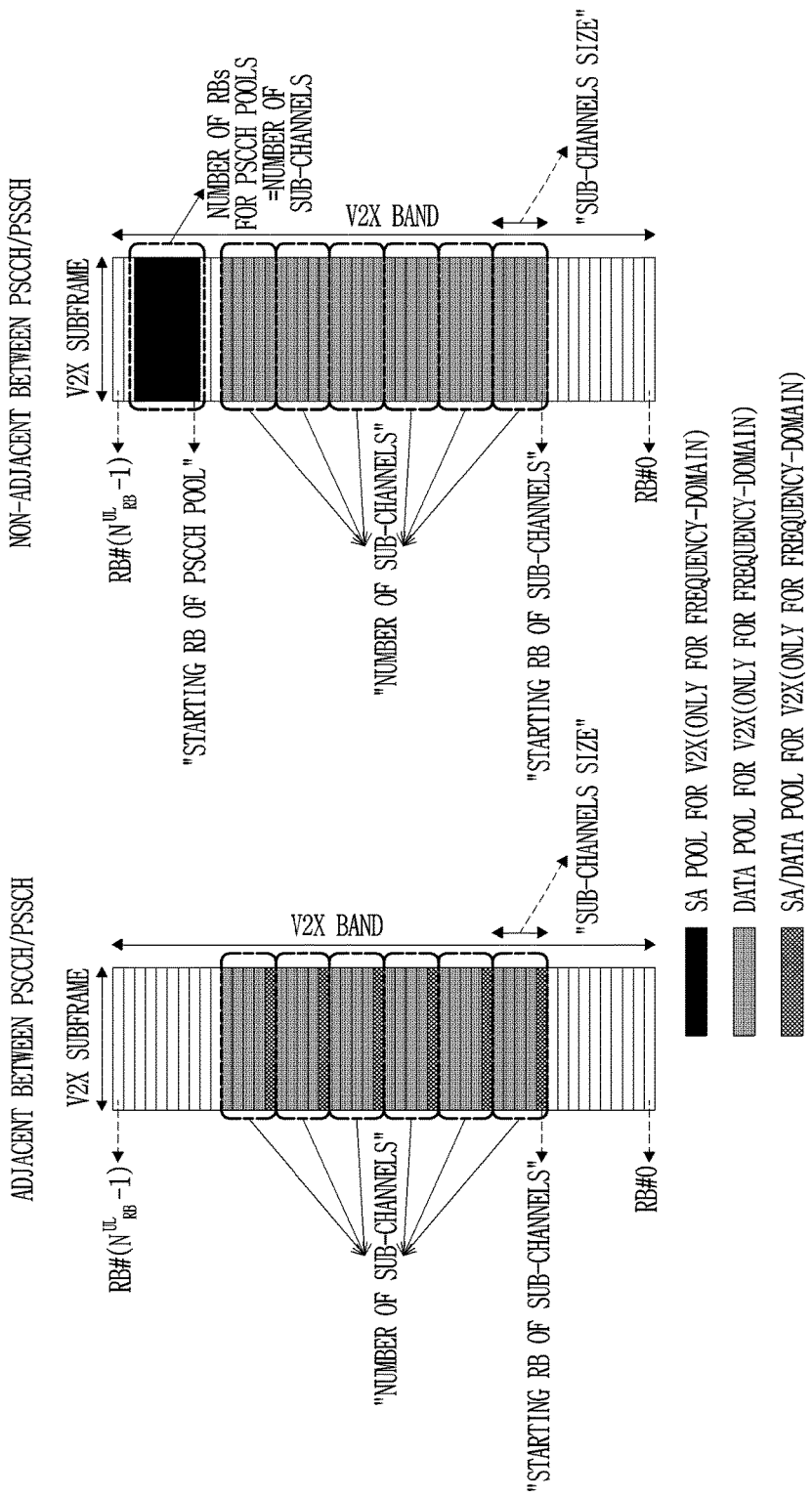
FIG. 6 is a diagram illustrating an example of a resource pool from the perspective of the frequency domain.

Referring to FIGS. 4 through 6, descriptions will be provided in association with the configuration of a Scheduling Assignment (SA) pool for a control channel (PSCCH) in which SA is transmitted, and in association with the configuration of a data pool for a data channel (PSSCH) in which data associated with SA is transmitted in V2X.

Here, the SA pool may be a set of resource candidates that are available for SA transmission; the data pool may be a set of resource candidates that are available for data transmission. That is, the SA pool is a resource pool for SA, and the data pool is a resource pool for data. Each resource pool may be referred to as a subframe pool from the perspective of the time domain, and may be referred to as a resource block pool from the perspective of the frequency domain.

The SA pool and the data pool which will be described in FIGS. 4 through 6 may be defined in the UE autonomous resource selection mode (mode 4).

In the eNodeB resource scheduling mode (mode 3), resources corresponding to all sidelink subframes in the time domain (i.e., all uplink subframes in LTE) and resources corresponding to all resource blocks in a V2X carrier (i.e., a band, or a component carrier or a cell in the case of carrier aggregation) in the frequency domain may become a set of resource candidates available for SA and/or data transmission. Alternatively, in the eNodeB resource scheduling mode (mode 3), an SA pool and a data pool may be separately defined; the sets of resource candidates available for the SA and/or data transmission may thus be configured in the same manner as in the UE autonomous resource selection mode (mode 4).

That is, the SA pool and the data pool which will be described with reference to FIGS. 4 through 6 may be defined in the UE autonomous resource selection mode (mode 4) and/or the eNodeB resource scheduling mode (mode 3).

Also, in the examples of FIGS. 4 through 6, a D2D Frame Number (DFN) period is merely an example for illustrative purposes. A period may correspond to a set of subframes, having the same number of subframes as the number of subframes in a System Frame Number (SFN) period and having a starting point which is the same as or different from the SFN period. For example, a single SFN period or a single DFN period may each correspond to 10240 subframes, which in turn correspond to 10240 ms.

FIGS. 4 and 5 are diagrams illustrating an example of a resource pool from the perspective of the time domain.

With respect to an SA pool and a data pool, a subframe resource pool configured in the time domain is as shown in FIG. 4. As illustrated in FIG. 4, the subframes for the SA pool and the data pool for V2X may be defined by a bitmap (e.g., 1100111011 in FIG. 4) which is repeated for all subframes excluding predetermined subframes. For example, the value of 1 in the bitmap indicates a subframe for the SA pool and the data pool, and the value of 0 in the bitmap indicates a subframe which does not belong to the SA pool and the data pool. The subframes for the SA pool and the data pool for V2X may be allowed to perform transmission and/or reception of SA and/or data for a resource pool in V2X.

Here, "all subframes excluding predetermined subframes" may indicate the set of subframes remaining after excluding predetermined subframes from all subframes belonging to a SFN or a DFN period, wherein the predetermined subframes are, for example, subframes in which V2X or direct link transmission in not allowed, or subframes used for other purposes beyond control information and/or data transmission in V2X (or in direct link transmission). For example, the predetermined subframes may correspond to subframes used for the transmission of a Sidelink Synchronization Signal (SLSS), and/or may correspond to DL subframes or special subframes in Time Division Duplex (TDD), but the predetermined subframes are not limited to these types of subframe correspondences. However, an uplink (UL) subframe may be used as a sidelink (SL) subframe in TDD.

Also, the repeatedly applied bitmap may be indicated by higher layer signaling such as Radio Resource Control (RRC) or the like. The length may be 16, 20, or 100, but is not limited thereto. The subframe indication of resource pool information illustrated in FIG. 4 may be an example of a field included in the higher layer signaling.

FIG. 4 illustrates an example assuming that the subframes for the SA pool and the data pool in a V2X transmission share the same subframes and assuming that the "subframe indication or resource pool" signaling field of FIG. 4 is configured for both the SA pool and the data pool by taking into consideration that SA and data are transmitted in the same subframe in V2X.

When V2X allows SA and data to be transmitted in different subframes, the subframes for the SA pool and the data pool for V2X may be different from each other. This does not mean that SA and data are always transmitted in different subframes, but rather that SA and data may be transmitted in the same subframe or may be transmitted in different subframes. To this end, the "subframe indication of resource pool" signaling field shown in FIG. 4 may be configured for the SA pool and the data pool respectively, as shown in FIG. 5.

FIG. 6 is a diagram illustrating an example of a resource pool from the perspective of the frequency domain.

The example of FIG. 6 will describe a resource pool from the perspective of the frequency domain when SA and data are transmitted in the same subframe.

With respect to an SA pool and a data pool, a subframe resource pool configured in the frequency domain is as shown in FIG. 6. As illustrated in FIG. 6, the configuration may be different based on whether a PSCCH transmitted in the SA pool and a PSSCH transmitted in the data pool are or are not adjacent in the frequency domain (Adjacent between PSCCH/PSSCH state or Non-adjacent between PSCCH/PSSCH state). In this instance, whether or not a PSCCH and a PSSCH are adjacent may be indicated by higher layer signaling such as RRC or the like, using a signaling field that indicates whether PSCCH and PSSCH RBs are adjacent to each other.

The cases in which a PSCCH transmitted in the SA pool and a PSSCH transmitted in the data pool are adjacent in the frequency domain may be described as follows.

As illustrated in FIG. 4, in a subframe of a resource pool configured in the time domain for V2X, a "Starting RB of sub-channels" signaling field corresponding to the starting RB of sub-channels may be defined based on a single RB unit (or granularity) with respect to all RBs in the frequency domain (from RB#0 to RB#($N^{UL}_{RB}$-1)). Here, $N^{UL}_{RB}$ denotes the total number of RBs corresponding to a system bandwidth. V2X for a sidelink is defined in a UL band, and thus SL can be substituted for UL. The "Starting RB of sub-channels" signaling field may be indicated by higher layer signaling, such as an RRC or the like. From an RB indicated by "Starting RB of sub-channels", consecutive RBs corresponding to a total of K sub-channels belong to the data pool. In this instance, the number of RBs included in a single sub-channel may be indicated by a "Sub-channel size" signaling field indicating the size of a sub-channel. The number of sub-channels, K, may be indicated by a "Number of sub-channels" signaling field, and may be included in higher layer signaling (e.g., an RRC or the like).

Here, RBs with the lowest RB index in each sub-channel may belong to the SA pool and to the data pool, and one or more of them may be used for PSCCH transmission. For example, SA may be transmitted in an RB with the lowest index among the RBs that belong to the data pool.

The cases in which a PSCCH transmitted in the SA pool and a PSSCH transmitted in the data pool are not adjacent in the frequency domain may be described as follows.

As illustrated in FIG. 4, in a subframe of a resource pool configured in the time domain for V2X, a "Starting RB of sub-channels" corresponding to the starting RB of sub-channels may be defined based on a single RB unit (or granularity) with respect to all RBs in the frequency domain (from RB#0 to RB#($N^{UL}_{RB}$-1)). Here, $N^{UL}_{RB}$ denotes the total number of RBs corresponding to a system bandwidth. V2X for a sidelink is defined in a UL band; thus UL can be replaced with SL. The "Starting RB of sub-channels" signaling field may be indicated by higher layer signaling, such as an RRC or the like. Consecutive RBs corresponding to a total of K sub-channels starting from an RB indicated as a "Starting RB of sub-channels" may belong to the data pool. In this instance, the number of RBs included in a single sub-channel may be indicated by a "Sub-channel size" signaling field indicating the size of a sub-channel. The number of sub-channels, K, may be indicated by a "Number of sub-channels" signaling field, and may be included in higher layer signaling, such as an RRC or the like.

As illustrated in FIG. 4, in a subframe of a resource pool configured in the time domain for V2X, a "Starting RB of PSCCH pool" corresponding to a starting RB of the SA pool may be defined based on a single RB unit (or granularity) with respect to all RBs in the frequency domain (from RB#0 to RB#($N^{UL}_{RB}$-1)). Here, $N^{UL}_{RB}$ denotes the total number of RBs corresponding to a system bandwidth. V2X for a sidelink is defined in a UL band, and thus UL can be replaced with SL. The "Starting RB of PSCCH pool" signaling field may be indicated by higher layer signaling, such as an RRC or the like. A total of K consecutive RBs starting from an RB indicates as a "Starting RB of PSCCH pool" may belong to the SA pool. Here, K is the same value as the number of sub-channels, K, in the data pool.

In the present disclosure, a subframe where SA is transmitted may be determined as follows.

A subframe in which SA is transmitted in the eNodeB resource scheduling mode (mode 3) is the first subframe included in a set of resource candidates. This subframe may be used for V2X on a V2X carrier or band from among subframes existing 4 ms (or 4 subframes) away from a subframe in which an eNodeB transmits downlink control information (DCI). When SA and data are transmitted in the same subframe, the subframe in which the SA is transmitted may be a subframe in which data is transmitted.

In the UE autonomous resource selection mode (mode 4), a UE may use sensing to autonomously determine a subframe in which SA is to be transmitted within the SA pool. When SA and data are transmitted in the same subframe, the subframe in which the SA is transmitted may be a subframe where data is transmitted.

Figure 7:
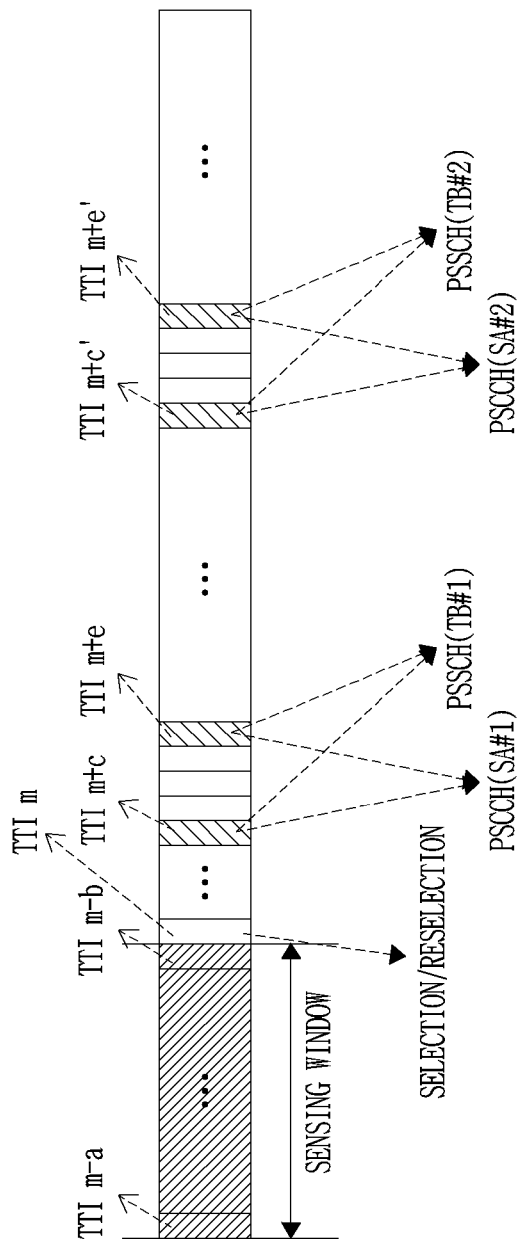
FIG. 7 is a diagram illustrating a process for determining an SA and Data transmission subframe in a UE autonomous resource selection mode.

FIG. 7 is a diagram illustrating an example of determining an SA and data transmission subframe in the UE autonomous resource selection mode (mode 4).

FIG. 7 illustrates an example of selecting a subframe, through sensing, for the transmission of a control channel and a data channel, from an SA pool for a control channel (PSCCH) and a data pool for a data channel associated with the SA pool.

A UE may select a resource for control channel and data channel transmission by inferring a time resource that has a low probability of being occupied by another UE. The UE achieves this by considering the result of sensing during a predetermined period of time prior to the point in time ("TTI m" of FIG. 7) when data to be transmitted occurs while sensing is performed in the SA pool and/or data pool. As an example, the point in time may indicate the point in time when data arrives from a higher layer to a lower layer (e.g., PHY layer). In this instance, the data is provided based on a MAC PDU unit from the perspective of the higher layer, and is provided based on a TB unit from the perspective of the lower layer. That is, "TTI m" indicates the point in time that is used as a reference point for when a UE selects/reselects a resource.

As another example, the UE may recognize a resource that is occupied by another UE through sensing performed in a sensing window which corresponds to an interval from "TTI m-a" to "TTI m-b". The UE may perform the transmission of a control channel and a data channel in a resource selected from among the resources remaining after excluding the resource that is occupied and used by the other UE from the resources in the resource pool.

Here, the values of a and b may be set (e.g., a=b+1000, b=1) to provide an interval corresponding to a DFN period prior to TTI m to be a sensing window, but this is merely an example and the values are not limited thereto.

Subsequently, "TTI m+c" may correspond to a TTI in which SA#1 (the first SA) is transmitted (the subframe in which SA#1 is transmitted when a single TTI corresponds to a single subframe). "TTI m+d" may correspond to a TTI in which initial transmission of TB#1 (the first TB), which is indicated by SA#1 and is transmitted, is performed (e.g., a subframe in which the initial transmission of TB#1 is performed when a single TTI corresponds to a single subframe). "TTI m+e" may correspond to a TTI in which retransmission of TB#1, which is indicated by SA#1 and is transmitted, is performed (e.g., a subframe in which retransmission of TB#1 is performed when a single TTI corresponds to a single subframe).

FIG. 7 illustrates the example of taking into consideration that SA and data are also transmitted in the same subframe, and thus, c=d.

"TTI m+c" may correspond to a TTI in which SA#2 (the second SA) is transmitted (a subframe in which SA#2 is transmitted when a single TTI corresponds to a single subframe). "TTI m+d" may correspond to a TTI in which initial transmission of TB#2 (the second TB), which is indicated by SA#2 and is transmitted, is performed (or a subframe in which initial transmission of TB#2 is performed when a single TTI corresponds to a single subframe). "TTI m+e" may correspond to a TTI in which retransmission of TB#2, which is indicated by SA#2 and is transmitted, is performed (or a subframe in which retransmission of TB#2 is performed when a single TTI corresponds to a single subframe).

FIG. 7 illustrates the example of taking into consideration that SA and data may be transmitted also in the same subframe, and thus, c'=d'.

Further, a point in time after $P_{rsvp}*j$ elapses from the initial transmission of TB#1 may be reserved for the initial transmission of TB#2. In this instance, $d'=d+P_{rsvp}*j$ For example, $P_{rsvp}$ may equal 100 and j may be signaled as a value from among values selected through carrier-specific (or band-specific) network configuration or throuth V2X pre-configuration within the range of {0, 1, . . . , 10}. For example, the value of j may be indicated by being selected through a "Resource reservation" signaling field of SCI included in SA. In this instance, when j=0, this indicates that the value of d' does not exist. That is,thismeans that a resource for TB#2 transmission is not reserved after a TTI correspondingelapses "$P_{rsvp}*j$" from "TTI m+d".

Although the example of FIG. 7 has been described with the assumption of the UE autonomous resource selection mode (mode 4), the description associated with the relationship of TTIs subsequent to "TTI m", excluding a sensing window, may also be applicable to the case of the eNodeB resource scheduling mode (mode 3). That is, excluding the sensing window in the example of FIG. 7, "TTI m+c" may correspond to the first subframe included in a set of resource candidates that may be used for V2X in a V2X carrier or band, selected from among subframes existing 4 ms (4 subframes) away from a subframe in which an eNodeB transmits downlink control information.

Figure 8:
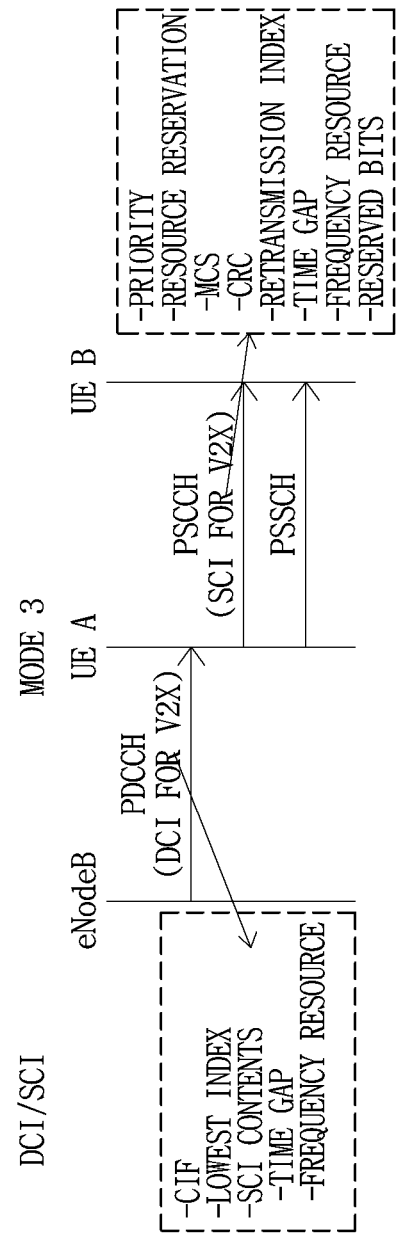
FIG. 8 is a diagram illustrating DCI and SCI in an eNodeB resource scheduling mode.

FIG. 8 is a diagram illustrating DCI and SCI in the eNodeB resource scheduling mode.

A subframe in which SA is transmitted in the eNodeB resource scheduling mode (mode 3) is the first subframe included in a set of the resource candidates which may be used for V2X on a V2X carrier or band, selected from among subframes existing 4 ms (4 subframes) away from a subframe in which an eNodeB transmits downlink control information (DCI).

In this instance, the information required when a V2X (or direct link) Tx UE (UE A of FIG. 8) transmits SA and data to a V2X (or direct link) Rx UE (UE B of FIG. 8) may be indicated by an eNodeB to the UE A through DCI. For example, the DCI may include information as listed in Table 5.

TABLE 5

DCI for V2X
CIF: 3 bits
Lowest index of sub-channel allocation: ceil(log2(K)): 0 to 5 bits
SA contents
Time gap between transmission and retransmission: 4 bits TABLE 5-continued Frequency resource of initial and last transmission
: ceil(log2(K*(K + 1)/2) = 0 to 8 bits The information associated with a resource block, which is a resource in the frequency domain used when UE A transmits SA to UE B in the subframe in which the SA is transmitted, may be indicated by "CIF" corresponding to a carrier indication field in Table 5 and a "Lowest index of sub-channel allocation" signaling field corresponding to the lowest index of sub-channel allocation.

The DCI in the eNodeB resource scheduling mode (mode 3) may include content related to Sidelink Control Information (SCI) as control information (Scheduling Assignment (SA)) associated with data transmission from UE A to UE B. In this instance, the content related to the SCI, which is indicated by being included in the DCI, may include a "Time gap between transmission and retransmission" value corresponding to the time gap between transmission and retransmission, and a "Frequency resource of initial and last transmission" signaling field indicating the frequency resource of a last transmission, as shown in Table 5.

Also, in various embodiments of the present disclosure, values called "Time gap between transmission and retransmission" and/or "Frequency resource of initial and last transmission" are merely examples, and the names do not limit the scope of the present invention. For example, the information indicated by "Time gap between transmission and retransmission" and/or "Frequency resource of initial and last transmission" may be changed based on a predetermined condition. In the present disclosure, the "Time gap between transmission and retransmission" field may be referred to as the first field, and the "Frequency resource of initial and last transmission" field may be referred to as the second field.

Figure 9:
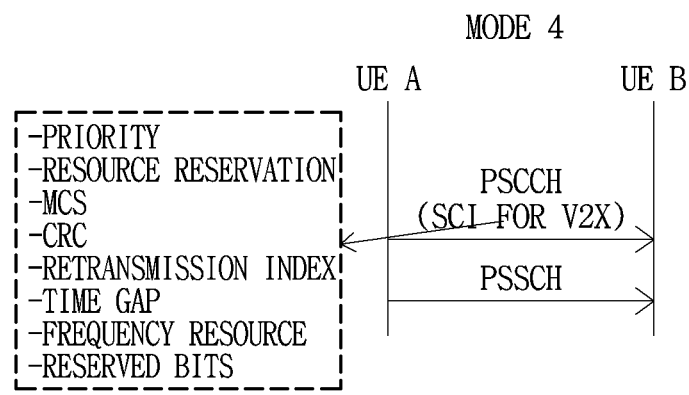
FIG. 9 is a diagram illustrating SCI in the UE autonomous resource selection mode.

FIG. 9 is a diagram illustrating SCI in the UE autonomous resource selection mode.

In the UE autonomous resource selection mode (mode 4), a UE may autonomously determine the subframe in which SA is to be transmitted from a SA pool (in particular, a subframe pool for SA), through sensing. Also, the UE may autonomously determine a resource block from the SA pool (particularly, a resource block pool for SA); this resource block is a resource in the frequency domain used for the transmission of the SA in the subframe where the SA is transmitted. Therefore, unlike the eNodeB resource scheduling mode (mode 3), the UE may not receive the "CIF" and "Lowest index of sub-channel allocation" signaling field from an eNodeB through DCI, but may autonomously determine the same.

In addition, in the UE autonomous resource selection mode (mode 4), the UE may autonomously determine content related to Sidelink Control information (SCI) as information (Scheduling Assignment (SA)) required when the UE transmits data in V2X. Therefore, unlike in the eNodeB resource scheduling mode (mode 3), the UE does not receive a first field (e.g., "Time gap between transmission and retransmission") and a second field (e.g., "Frequency resource of initial and last transmission") from an eNodeB through DCI, but may autonomously determine the same.

That is, the Sidelink Control information (SCI), which corresponds to the information (Scheduling Assignment (SA)) required when the UE transmits data, is determined based on information that the eNodeB transmits to the UE in the eNodeB resource scheduling mode (mode 3), and that is autonomously determined by the UE in the UE autonomous resource selection mode (mode 4).

In both the eNodeB resource scheduling mode (mode 3) and the UE autonomous resource selection mode (mode 4), a UE (UE B) that receives data needs SCI corresponding to control information (Scheduling Assignment (SA)) in order to decode the data transmitted from the UE (UE A) that transmits the data. Therefore, a UE A is required to transmit the SCI corresponding to the control information SA to the UE (UE B) that receives the data. As an example, the SCI may include information as listed in Table 6.

TABLE 6

SCI for V2X
Priority: 3 bits
Resource reservation: 4 bits
MCS: 5 bits
CRC: 16 bits
Retransmission index: 1 bit
Time gap between transmission and retransmission: 4 bits
Frequency resource of initial and last transmission: 8 bits
Reserved bits: 7 bits Next, information included in DCI of Table 5 and SCI of Table 6 will be described in detail.

As described above, information associated with a resource block that is a resource in the frequency domain used for SA transmission in the eNodeB resource scheduling mode (mode 3) may be indicated by being included in DCI, and the information may be the "CIF" and the "Lowest index of sub-channel allocation" signaling field mentioned in Table 5.

The "CIF" signaling field may have a size of 3 bits, and indicates a carrier (band) to be used for V2X. As an example, when a total of 5 carriers are allowed for the UE, an indicator distinguishing between each carrier may have the size of 3 bits (i.e., ceil(log2(5))=3, here, ceil(x) is the minimum integer which is greater than or equal to x). The indicator may indicate which of the 5 carrier should be used for SA transmission.

The "Lowest index of sub-channel allocation" signaling field may indicate a resource block in a carrier (or band) for V2X, which is to be used for SA transmission, in a subframe in which SA is transmitted.

The "Lowest index of sub-channel allocation" signaling field may indicate the sub-channel with the lowest index in sub-channels used for the transmission of data related to the SA, from among a total of K sub-channels having indices 0 to K-1. To this end, ceil(log2(K)) bits may be needed. The value of K is variable based on the size of a system bandwidth. For example, the maximum value of K may be 20. Accordingly, a minimum of 0 bits to a maximum of 5 bits may be used for the "Lowest index of sub-channel allocation" field.

For example, when a total of six sub-channels having indices 0 to 5 exist, and a PSSCH is allocated to a total of four sub-channels corresponding to indices 2 to 5 from among the six sub-channels and when the PSSCH is used for the transmission of data related to the SA, the value indicated by "Lowest index of sub-channel allocation" may be index 2. To indicate this value, a total of 3 (ceil(log2(6))) bits are needed.

In this instance, when a PSCCH for transmitting SA is adjacent to a PSSCH for transmitting data in the frequency domain, the PSCCH for transmitting SA may be allocated in the RB with the lowest RB index in the sub-channel indicated by "Lowest index of sub-channel allocation". When a PSCCH for transmitting SA is not adjacent to a PSSCH for transmitting data in the frequency domain, the PSCCH for transmitting SA may be allocated in an RB that one-to-one matches the sub-channel indicated by "Lowest index of sub-channel allocation" (see the diagram on the right of FIG. 6).

As an example, it is assumed that the index value indicated by "Lowest index of sub-channel allocation" is index 2. In this instance, when a PSCCH for transmitting SA and a PSSCH for transmitting data are adjacent in the frequency domain, the PSCCH for transmitting SA may be allocated to the RB with the lowest RB index in a sub-channel corresponding to index 2 (e.g., an RB corresponding to r+2* "sub-channel size" when an RB index corresponding to "Starting RB of sub-channels" is r as shown in the diagram on the left of FIG. 6). Alternatively, when a PSCCH for transmitting SA and a PSSCH for transmitting data are not adjacent in the frequency domain, the PSCCH for transmitting SA may be allocated to an RB that one-to-one matches a sub-channel corresponding to index 2 (e.g., an RB corresponding to s+2 when an RB index corresponding to "Starting RB of PSCCH pool" is s as shown in the diagram on the right of FIG. 6).

Subsequently, a first field (e.g., "Time gap between transmission and retransmission") and a second field (e.g., "Frequency resource of initial and last transmission") for indicating a resource used for a PSSCH for transmitting data among the SA contents in Table 5, may be included in DCI in the eNodeB resource scheduling mode (mode 3). Also, in the case of a first field (e.g., "Time gap between transmission and retransmission") and a second field (e.g., "Frequency resource of initial and last transmission") taken from Table 6, a value indicated through DCI is included in SCI in the eNodeB resource scheduling mode (mode 3). However, in the UE autonomous resource selection mode (mode 4), the UE determines the values based on a resource that the UE autonomously selects through sensing.

The first field (e.g., "Time gap between transmission and retransmission") may indicate a gap between a subframe in which TB-unit-based data related to SA is initially transmitted and a subframe in which TB-unit-based data is retransmitted, or the first field may indicate a gap between a subframe in which TB-unit-based data related to the SA is initially transmitted and a subframe in which the SA is retransmitted. The value may be a value in the range of 0 to 15. A value of 0 indicates that the retransmission of a TB does not exist, which is indicated through SA including the SCI and is transmitted. When the value is in the range of 1 to 15, this indicates that a TB, which has been indicated through SA including the SCI and has been initially transmitted, should be retransmitted after 1 to 15 subframes elapses. For example, in the UE autonomous resource selection mode (mode 4), the first field (e.g., "Time gap between transmission and retransmission") may indicate a gap between a subframe corresponding to "TTI m+d (=TTI m+c)" and a subframe corresponding to "TTI m+e" as shown in FIG. 7.

Subsequently, the second field (e.g., "Frequency resource of initial and last transmission") may indicate RBs in the frequency domain, which are used for transmission in a subframe in which the TB-unit-based data is initially transmitting and in a subframe in which the TB-unit-based data is retransmitted. Additionally, the second field (e.g., "Frequency resource of initial and last transmission") may indicate information associated with sub-channels used for the initial transmission of data (the number of sub-channels used for the retransmission of data is equal to the number of sub-channels used for the initial transmission), and may indicate information associated with the lowest index among sub-channels used for the retransmission of data.

More particularly, when a TB is indicated through SA including the SCI and is initially transmitted, the lowest index among indices of sub-channels used for the initial transmission may be indicated by the "Lowest index of sub-channel allocation" signaling field in the eNodeB resource scheduling mode (mode 3), and may be autonomously determined by an UE in the UE autonomous resource selection mode (mode 4). Here, information indicating the number of sub-channels to be used for the transmission may be included in the second field (e.g., "Frequency resource of initial and last transmission").

In addition, when a TB is indicated through SA including the SCI and is retransmitted, the lowest index among indices of the sub-channels used for the retransmission may also be included in the second field (e.g., "Frequency resource of initial and last transmission"). Information indicating the number of sub-channels to be used for TB retransmission may be indicated by the second field (e.g., "Frequency resource of initial and last transmission"), and as many sub-channels as the number of sub-channels which have been used for the initial transmission of the TB may be used.

For example, in the UE autonomous resource selection mode (mode 4), RBs for transmitting a PSSCH in a sub-frame corresponding to "TTI m+d (=TTI m+c)" and a subframe corresponding to "TTI m+e" may be indicated by the second field (e.g., "Frequency resource of initial and last transmission").

For the second field (e.g., "Frequency resource of initial and last transmission"), a total of ceil(log2(K*(K+1)/2) bits may be used on the assumption of K sub-channels. For example, because the maximum value of K is 20, a minimum of 0 bit to a maximum of 8 bits may be needed.

Among other signaling fields included in the SCI of Table 6, "Priority" may indicate the priority of TB-unit-based data which is desired to be transmitted.

As described above, "Resource reservation" may indicate j∈{0, 1, 2, . . . , 10}, which is a parameter used for indicating a reserved resource in the UE autonomous resource selection mode (mode 4).

"Modulation and Coding Scheme" (MC S) may indicate the modulation scheme and coding scheme of TB-unit-based data which should be transmitted.

"Retransmission index" may indicate whether the retransmission of TB-unit-based data exists.

"Cyclical Redundancy Check (CRC)" may be added to SCI and may be used for detecting an error when the SCI is transmitted and/or for distinguishing the SCI from another SCI.

Next, examples of the present disclosure associated with a resource pool for V2X communication will be described. More specifically, in the eNodeB resource scheduling mode (mode 3) or in the UE autonomous resource selection mode (mode 4), the process whereby a UE determines a subframe pool, and information (configuration) which is provided from an eNodeB to a UE for the determination of the subframe pool, will be described.

Figure 10:
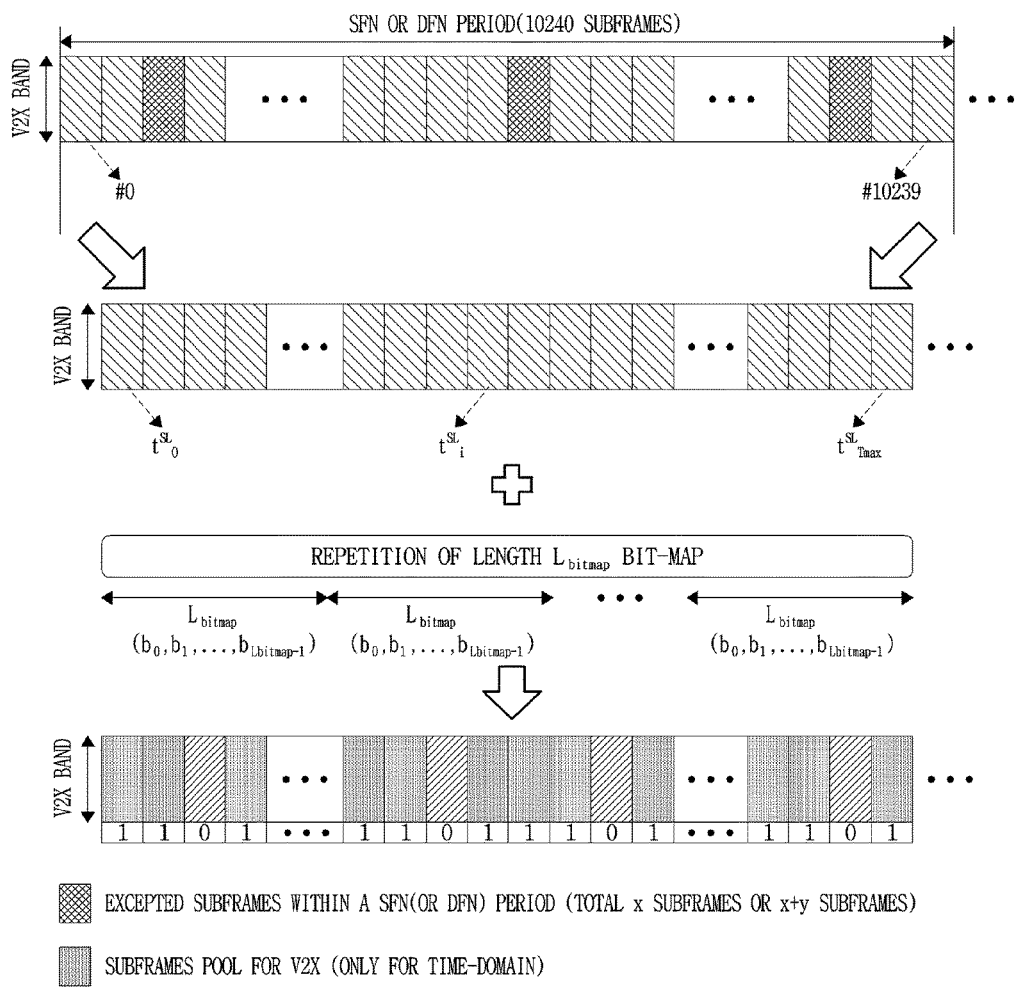
FIG. 10 is a diagram illustrating the configuration of a subframe pool within a predetermined period.

FIG. 10 is a diagram illustrating the configuration of a subframe pool within a predetermined period.

FIG. 10 illustrates a set of all subframes belonging to a predetermined period. For example, the predetermined period may be an SFN period or a DFN period (10240 ms). Because the time length of one subframe is 1ms, a total of 10240 subframes (i.e., subframe indices #0 to #10239) may be included in the predetermined period.

The subframes remaining after excluding or skipping predetermined subframe(s) from the universal set of the subframes in the predetermined period may be expressed as $t^{SL}_i$ (0≤i≤Tmax). That is, the subframes corresponding to $\{t^{SL}_0, t^{SL}_1, \ldots, t^{SL}_{Tmax-1}\}$ may be a set of subframes which may belong to a resource pool for V2X communication. In the set of subframes $\{t^{SL}_0, t^{SL}_1, \ldots, t^{SL}_{Tmax-1}\}$, subframes may be arranged in ascending order of the subframe indices from subframe #0 of a radio frame corresponding to SFN 0 (in mode 3) or DFN 0 (in mode 4) of a serving cell.

That is, the subframes corresponding to $\{t^{SL}_0, t^{SL}_1, \ldots, t^{SL}_{Tmax-1}\}$ may be a set of subframes which may belong to a resource pool for V2X communication. Here, the subframes themselves, which correspond to $\{t^{SL}_0, t^{SL}_1, \ldots, t^{SL}_{Tmax-1}\}$ do not indicate a resource pool, but a part or all of them may be configured as a resource pool.

The universal set of the subframes in the predetermined period may be referred to as a target subframe set to which a bitmap indicating a resource pool is applied (specifically, a subframe pool corresponding to the time domain of the resource pool). Here, the predetermined subframe(s) may correspond to, for example, a subframe in which an SLSS resource is configured, a TDD DL subframe, a special subframe, and/or a bitmap-non-applied-subframe (which will be described in detail later), and the like.

The bitmap associated with the resource pool may be expressed as $\{b_0, b_1, \ldots, b_{Lbitmap-1}\}$. Here, $L_{bitmap}$ denotes the length of the bitmap, which is set by a higher layer. The value of $L_{bitmap}$ may be 16, 20, or 100, but is not limited thereto. If $L_{bitmap}$ is set to a value smaller than the number of subframes belonging to the predetermined period, the bitmap may be repeatedly applied within the predetermined period.

A subframe pool may be configured with subframes corresponding to a value of 1 indicated by the bitmap. That is, subframes corresponding to $t^{SL}_k$ (here, 0≤k<(10240-x-y)) may belong to a subframe pool when $b_{k'}=1$ (here, k'=k mod $L_{bitmap}$; mod indicates a modulo operation). That is, the subframe pool may include subframes that satisfy $b_{k'}=1$ among $t^{SL}_k$ when k'=k mod $L_{bitmap}$.

Here, x may correspond to the number of subframes in which an SLSS is configured within the predetermined period. For example, the value of x may be 0 or 64. When a period for configuring an SLSS is 160 ms, 64 SLSS subframes may exist in a predetermined period having a length of 10240 ms; therefore, x=64. Alternatively, when an SLSS is not configured, x=0. In the present disclosure, x SLSS-configured-subframes may be referred to as first-type-excluded-subframes.

In addition, y corresponds to the number of bitmap-non-applied-subframes in the predetermined period. As an example, the value of y may be 0, 16, 40, or 76. Here, the bitmap-non-applied-subframe may be determined based on the length of a predetermined period, the length of the bitmap, a subframe in which V2X transmission is reserved, or the like. Detailed examples for these cases will be described later. In the present disclosure, y bitmap-non-applied-subframes may be referred to as second-type-excluded-subframes.

When SA and/or data transmission is scheduled (or granted) in a subframe $t^{SL}_m$ in the resource pool determined as described above, SA and/or data transmission may be reserved in a subframe $t^{SL}_{m+Prsvp*j}$ after $P_{rsvp}*j$ elapses from $t^{SL}_m$. Here, it is defined that j=1, 2, . . . , $C_{resel}$-1. In this instance, $C_{resel}$ may be $C_{resel}=A*SL\_RESOURCE\_RESELECTION\_COUNTER$ related to a resource reselection counter.

For example, A=6 or 10, and the maximum value of SL_RESOURCE_RESELECTION_COUNTER may be 15. $P_{rsvp}$ is a resource reservation interval set by a higher layer. For example, 100 may be fixedly used as $P_{rsvp}$, or one selected from among 100 and one or more other values may be selected and used as $P_{rsvp}$.

For example, there is a scenario where $P_{rsvp}$=100, Tmax=10240, and j=1, 2, . . . , 149. Also, the length of a bitmap is 100, the value of a first bit is 1, and the value of a $61^{th}$ bit is 0 (i.e., a subframe pool includes subframe #0 but does not include subframe #60). Also, the index of a first subframe in which SA and/or data transmission is scheduled, in the subframe pool, is #0. In this instance, subframe indices #0, #100, #200, . . . , and #10200 of a first period and subframe indices #60, #160, . . . , and #4760 of a second period may be reserved. Here, one period includes indices up to #10239, a subframe corresponding to #10300, which is reserved after #10200, may be #60 of the second period.

As described above, the case in which a resource is reserved beyond one predetermined period (e.g., an SFN period or a DFN period) may be expressed as an SFN (or DFN) wrap-around situation in resource reservation. When Tmax is indivisible by $L_{bitmap}$ (i.e., when the number of subframes included in the set of subframes to which a bitmap is to be applied is not an integer multiple of the length of the bitmap), only a part of the bitmap (i.e., only a front part of the bitmap) is applied in the last part of the first period, and the bitmap is newly and repeatedly applied in the second period. In this instance, in the second period, the subframes #60, #160, #260, . . . and the like may not be included in a subframe pool according to the bitmap. However, SA and/or data transmission/reception is reserved. Accordingly, there may be ambiguity. This may be called ambiguity attributable to SFN (or DFN) wrap-around.

To avoid ambiguity attributable to SFN (or DFN) wrap-around, tone or more of: the number of bitmap-non-applied-subframes y (or the number of second-type-excluded-subframes) and the pattern of bitmap-non-applied-subframes, a resource reservation interval $P_{rsvp}$ configuration, and/or restriction on the maximum value of a resource reservation multiple parameter j may be applied in the system described above. Next, detailed examples of the present disclosure will be described.

Figure 11:
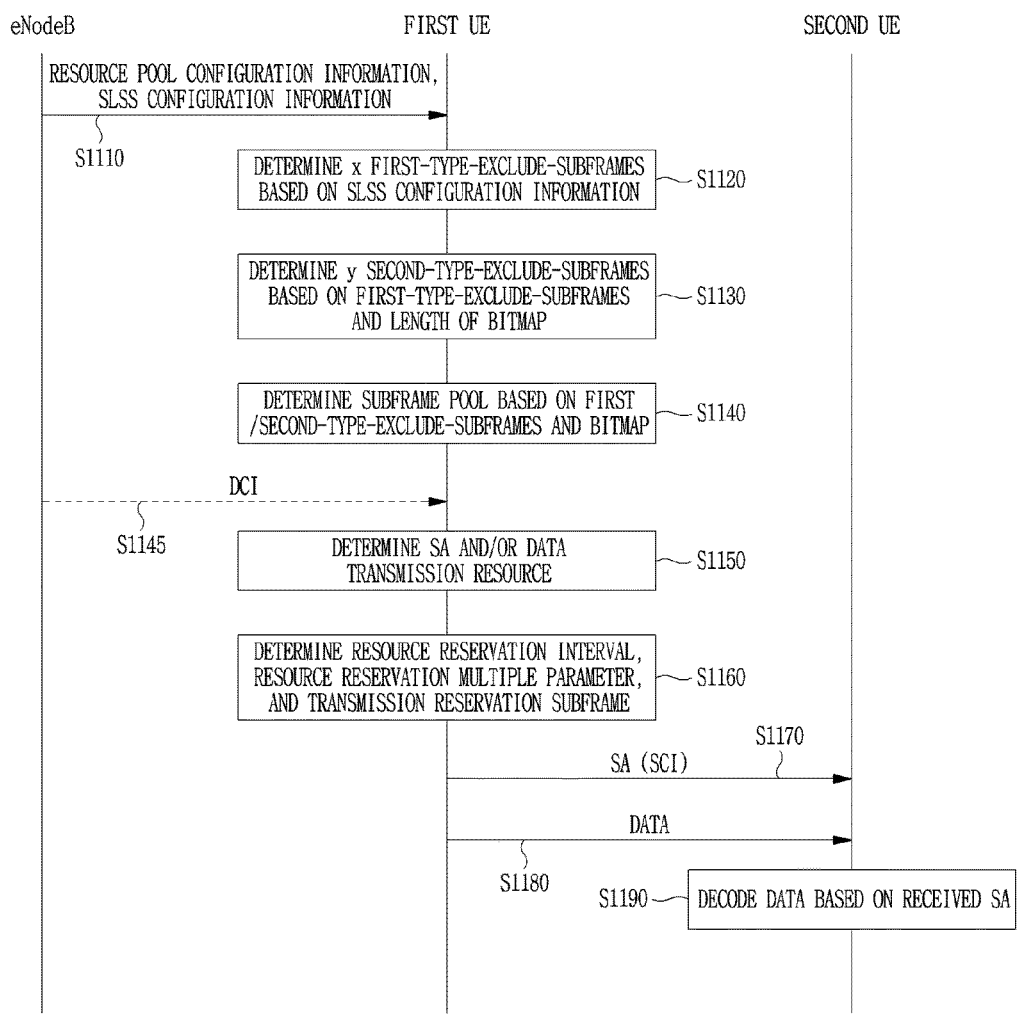
FIG. 11 is a flowchart illustrating a method for determining a resource pool.

FIG. 11 is a flowchart illustrating a method of determining a resource pool.

In the example of FIG. 11, a first UE and a second UE correspond to UEs that join in V2X communication or direct link communication, wherein the first UE corresponds to an SA and data transmission (Tx) UE, and the second UE corresponds to an SA and data reception (Rx) UE.

In operation S1110, an eNodeB may transmit, to the first UE, resource pool configuration information for V2X communication, SLSS configuration information, and the like. For example, the eNodeB may transmit the information through higher layer signaling. Here, the resource pool configuration information may correspond to "subframe indication of resource pool" information including a bitmap having a length of $L_{bitmap}$. In addition, the SLSS configuration information may correspond to "SL V2V synchronization configuration" information (i.e., configuration information associated with whether a UE transmits and receives synchronization information associated with a sidelink for V2V).

In operation S1120, the first UE may determine x first-type-exclude-subframes (i.e., subframes in which an SLSS resource is configured) based on the SLSS configuration information. Accordingly, the x first-type-exclude-subframes may be excluded from a set of all subframes belonging to a predetermined period (e.g., 10240 subframes which correspond to all subframes in a single SFN (or DFN) period). Here, the set of subframes remaining after excluding the x first-type-exclude-subframes from the set of all subframes may be referred to as a first subset. For example, x=0 or 64.

In operation S1130, the first UE may determine a second-type-exclude-subframe (i.e., an additional bitmap-non-applied-subframe) by taking into consideration the first subset, $L_{bitmap}$, and the like determined in operation S1120. Particularly, the first UE may determine whether to additionally exclude the second-type-exclude-subframe. When needed, the UE may determine the number of second-type-exclude-subframes. Accordingly, y second-type-exclude-subframes may be excluded from the first subset, and the result may be referred to as a second subset. For example, y=0, 16, 40, or 76.

In operation S1140, the first UE may repeatedly apply the bitmap having a length of $L_{bitmap}$ to the second subset which has been determined by taking into consideration the first-type-exclude-subframes and the second-type-exclude-subframes. According to the present disclosure, the number of subframes of the second subset may be a multiple of $L_{bitmap}$, whereby ambiguity attributable to the above described SFN (or DFN) wrap-around may not occur.

Operation S1145 is performed when the first UE is set to operate in the eNodeB resource scheduling mode (mode 3), and is omitted when the first UE is set to operate in the UE autonomous resource selection mode (mode 4). In operation S1145, the first UE receives, from the eNodeB, DCI including scheduling information (or grant information) of SA and/or data transmission.

In operation S1150, when the first UE is set to operate in the eNodeB resource scheduling mode (mode 3), the first UE may determine a resource (e.g., a subframe and a sub-channel) to be used for transmitting SA and/or data to the second UE, based on the DCI received from the eNodeB. When the first UE is set to operate in the UE autonomous resource selection mode (mode 4), the first UE may autonomously determine a resource to be used for transmitting SA and/or data to the second UE. For example, the first UE may determine a resource through which SA and/or data is to be transmitted, by taking into consideration the state of channel occupancy by a sensing window in a predetermined period prior to the point in time when a TB to be transmitted to the second UE has been generated.

In operation S1160, the first UE determines a resource reservation interval ($P_{rsvp}$) and a resource reservation multiple parameter (j), and may determine transmission-reservation-subframes based thereon.

For example, a fixed value (e.g., $P_{rsvp}$=100) may be used as $P_{rsvp}$, or one selected from among a plurality of values may be used as $P_{rsvp}$. In this instance, when a value selected from among the plurality of values is used, $P_{rsvp}$ may be directly indicated by higher layer signaling. $P_{rsvp}$ may be determined in connection with $L_{bitmap}$, or $P_{rsvp}$ may be determined based on information associated with whether a short resource reservation period is used and $L_{bitmap}$.

When one fixed value is always used as $P_{rsvp}$, $P_{rsvp}$ may always be 100 irrespective of the value of $L_{bitmap}$ (16, 20, or 100).

When one value selected from among a plurality of values is used as $P_{rsvp}$, and $P_{rsvp}$ is indicated directly by higher layer signaling, one value may be selected from among the plurality of values as $P_{rsvp}$, irrespective of the value of $L_{bitmap}$ (16, 20, or 100). For example, although either 25 (if the reservation period is short) or 100 may be selected as the value, the value is not limited thereto.

When one value selected from among a plurality of values is used as $P_{rsvp}$, and $P_{rsvp}$ is determined in connection with $L_{bitmap}$, the first UE may directly receive, from an eNodeB, the value of $P_{rsvp}$ which is determined in connection with $L_{bitmap}$ (or a value indicating a combination of $P_{rsvp}$ and $L_{bitmap}$), or the first UE may autonomously determine the value of $P_{rsvp}$ associated with the value of $L_{bitmap}$ based on the value of $L_{bitmap}$ received in operation S1110.

As an example, the value of $P_{rsvp}$ associated with the value of $L_{bitmap}$ may be determined as shown in Table 7 provided below. In this instance, when the value of $P_{rsvp}$ is one of the values corresponding to multiples of 16 in Table 7, the value may be 16, 32, 96, or 112, wherein 16 and 32 are multiples of 16 that are close to 25 (if the reservation period is short), and 96 and 112 are multiples of 16 that are close to 100. However, the value is not limited thereto.

TABLE 7

| $L_{bitmap}$ | $P_{rsvp}$ |
|---|---|
| 100 | 100 |
| 20 | 100 |
| 16 | One of values corresponding to multiples of 16 |

In this instance, one value selected from among a plurality of values is used as $P_{rsvp}$, and $P_{rsvp}$ is determined based on $L_{bitmap}$ and on information associated with whether a short resource reservation period is used. Then, the first UE may directly receive, from an eNodeB, the value of $P_{rsvp}$ which is determined based on $L_{bitmap}$ (or a value indicating the combination of the information associated with whether a short resource reservation period is used and $L_{bitmap}$) and on the information associated with whether a short resource reservation period is used and $L_{bitmap}$. Alternatively, the first UE may autonomously determine the value of $P_{rsvp}$ in association with information of whether a short resource reservation period is used and $L_{bitmap}$ based on the information associated with whether a short resource reservation period is used (information whether a short reservation period is used or not may be indicated by the eNodeB through higher layer signaling such as RRC or the like) and $L_{bitmap}$ received from the eNodeB in operation S1110. For example, the value of $P_{rsvp}$ in association with information of whether a short reservation period is used and the value of $L_{bitmap}$ may be determined as shown in Table 8 provided below. When the value of $P_{rsvp}$ is one of the values corresponding to multiples of 16 in Table 8, the value may be one of 16 and 32 which are multiples of 16 that are close to 25 when a short reservation period is used, and the value may be one of 96 and 112 which are multiples of 16 that are close to 100 when a short reservation period is not used. However, the value is not limited thereto.

TABLE 8

| Short reservation period | $L_{bitmap}$ | $P_{rsvp}$ |
|---|---|---|
| Not used | 100 | 100 |
| Not used | 20 | 100 |
| Not used | 16 | One of values corresponding to multiples of 16 |
| Used | 100 | 25 |
| Used | 20 | 25 |
| Used | 16 | One of values corresponding to multiples of 16 |

As described above, even when $L_{bitmap}=16$, 100 may be used as the value of $P_{rsvp}$. However, in the case of $L_{bitmap}=16$, when a bitmap having a length of 16 bits is ($b_0$, $b_1$, $b_2$, ..., $b_{15}$), $P_{rsvp}=100$. Accordingly, subframes in units of multiples of 100 may or may not belong to a subframe pool together. That is, the bit values of ($b_0$, $b_4$, $b_8$, $b_{12}$) need to always be the same. In the same manner, the bit values of ($b_1$, $b_5$, $b_9$, $b_{13}$) need to always be the same, the bit values of ($b_2$, $b_6$, $b_{10}$, $b_{14}$) need to always be the same, and the bit values of ($b_3$, $b_7$, $b_{11}$, $b_{15}$) need to always be the same. This is merely a four-bit bitmap repeated four times, as opposed to a 16-bit bitmap. Therefore, the configuration of a bitmap may be under restrictions.

Even if there are restrictions, in order to set the resource reservation interval $P_{rsvp}$ to be the same in all cases, the value of $P_{rsvp}$, which is the same as the value of $P_{rsvp}$ (e.g., $P_{rsvp}=100$) when $L_{bitmap}=20$ or 100, may be used when $L_{bitmap}=16$.

Alternatively, to overcome the restrictions, with respect to 100 subframes corresponding to $P_{rsvp}=100$, a bitmap ($b_0$, $b_1$, $b_2$, $b_{15}$) having a length of 16 in the case of $L_{bitmap}=16$, is applied six times and only a part ($b_0$, $b_1$, $b_2$, $b_3$) is applied with respect to the last four subframes. With respect to the subsequent 100 subframes, the bitmap ($b_0$, $b_1$, $b_2$, $b_{15}$) having a length of 16 is applied six times; only the front four bits ($b_0$, $b_1$, $b_2$, $b_3$) of the bitmap are applied with respect to the last four subframes, in the same manner as described above. In this manner, when a bitmap having a length of 16 is applied with respect to 10240 subframes included in a single SFN (or DFN) period based on a 100-subframe unit, as described above, the above restriction may not exist. However, it is the same as the case in which a bit value is applied based on a 100-subframe period. Therefore, ambiguity attributable to SFN (or DFN) wrap-around may occur, as in the case of $L_{bitmap}=20$ or 100.

Therefore, in the case of $L_{bitmap}=16$, one of the multiples of 16 may be set as $P_{rsvp}$, as described above, to overcome the above restriction. In this instance, the restriction caused when $P_{rsvp}$ is indivisible by $L_{bitmap}$ may be overcome. At the same time, ambiguity attributable to SFN (or DFN) wrap-around may not be generated because the value10240 (corresponding to the total number of subframes in a single SFN (or DFN) period) is divisible by the value 16 corresponding to $L_{bitmap}$. However, in this instance, the resource reservation interval $P_{rsvp}$ must be set to be different from the case of $L_{bitmap}=20$ or 100. Therefore, the number of events, which must be taken into consideration in a resource reservation process, may be increased.

In operations S1170 and S1180, the first UE may map SA and data to the resource determined in operation S1150, and may transmit the same to the second UE. For example, in operation S1170, the first UE may transmit SA corresponding to SCI to the second UE. Then in operation S1180, the first UE may transmit data to the second UE in a resource indicated by the SCI transmitted in operation S1170.

In operation S1190, the second UE may attempt to receive the SA from the first UE according to a blind decoding scheme. The blind decoding scheme may include monitoring the locations of candidate resources through which SA may be received. Also, the second UE may determine a resource in which data is to be received based on the SCI received from the first UE, and may attempt to decode the data transmitted from the first UE.

Although the above described illustrative methods of FIG. 11 are expressed as a series of operations, they do not limit the order of operations executed; the operations may be executed in parallel or in a different order. In order to implement the system described above, another operation may be added to the described operations, only the operations remaining after excluding one or more operations may be included, or one or more operations may be excluded and additional other operations may be included.

Next, more detailed examples associated with FIG. 11 will be described.

One feature in FIG. 11 is that the number of second-type-exclude-subframes (y) is taken into consideration. In addition, in the case of $L_{bitmap}$=16, one of the multiples of 16 (e.g., 96) may be set as the value of $P_{rsvp}$. Although above described restrictions may exist, 100 may be used as the value of $P_{rsvp}$ in the case of $L_{bitmap}$=16 (like the case of $L_{bitmap}$=20 or 100.) When $P_{rsvp}$ is set as described above, ambiguity may be removed if an SFN (or DFN) wrap-around situation occurs, or the SFN (or DFN) wrap-around situation may not occur.

x, $L_{bitmap}$, and y according to the example of FIG. 11 may be set as shown in Table 9 provided below.

TABLE 9

| x | $L_{bitmap}$ | y |
|---|---|---|
| 0 | 100 | 40 |
| 0 | 20 | 0 |
| 0 | 16 | 0 |
| 64 | 100 | 76 |
| 64 | 20 | 16 |
| 64 | 16 | 0 |

Referring to Table 9, concrete embodiments of the method of FIG. 11 will be described.

Embodiment 1

This embodiment relates to the case in which $L_{bitmap}$=100 and x=0. In this instance, y=40, as shown in Table 9. Accordingly, a subframe pool is determined to be $t^{SL}_k$ (here, 0≤k<(10240-0-40)). That is, a bitmap may be repeatedly applied to subframes (i.e., a second subset) remaining after excluding 40 subframes (y=40). In this instance, a bitmap having a length of 100 is repeatedly applied to 10200 subframes, and thus, the number of target subframes to which the bitmap is to be applied (i.e., Tmax) may be an integer multiple of the length of the bitmap (or the number of target subframes to which the bitmap is to be applied is divisible by the length of the bitmap).

Next, examples of the pattern of 40 second-type-exclude-subframes (y=40) will be described.

Embodiment 1-1

40 second-type-exclude-subframes may exist at intervals of 256(=10240/40) subframes. For example, subframe indices #255, #511, . . . , and #10239 may correspond to second-type-exclude-subframes.

That is, subframes corresponding to subframe indices $y_n$ in a single SFN (or DFN) period may be the second-type-exclude-subframes. Here, it is defined that $y_n$=256*(n+1)-1 and, n=0, 1, . . . , 39.

Embodiment 1-2

40 second-type-exclude-subframes may be the last 40 subframes in 10240 subframes in a single SFN (or DFN) period. For example, subframe indices #10201, #10202, . . . , and #10240 may correspond to the second-type-exclude-subframes.

That is, subframes corresponding to subframe indices $y_n$ in a single SFN (or DFN) period may be the second-type-exclude-subframes. Here, it is defined that $y_n$=10240-n and, n=0, 1, . . . , 39.

Embodiment 2

This embodiment relates to the case in which $L_{bitmap}$=100 and x=64. In this instance, it is determined that y=76, as shown in Table 9. Accordingly, a subframe pool is determined to be $t^{SL}_k$ (here, 0≤k<(10240-64-76)). That is, a bitmap may be repeatedly applied to subframes (i.e., a second subset) remaining after excluding subframes corresponding to x=64 and y=76. In this instance, a bitmap having a length of 100 is repeatedly applied to 10100 subframes, and thus, the number of target subframes to which the bitmap is to be applied (i.e., Tmax) may be an integer multiple of the length of the bitmap (or the number of target subframes to which the bitmap is to be applied is divisible by the length of the bitmap).

Next, examples of the pattern of 72 second-type-exclude-subframes (y=72) will be described.

Embodiment 2-1

76 second-type-exclude-subframes may be one or two subframes following after first-type-exclude-subframes (i.e., SLSS transmission subframes).

For example, 64 second-type-exclude-subframes among the 76 second-type-exclude-subframes (y=76) may be determined to be subframes immediately after the 64 first-type-exclude-subframes (x=64) among 10240 subframes included in a single SFN (or DFN) period. Additionally, the 12 remaining second-type-exclude-subframes out of the 76 subframes (y=76) may be determined to be second following subframes which respectively follow after $1^{st}$, $6^{th}$, $11^{th}$, $16^{th}$, $21^{st}$, $26^{th}$, $31^{st}$, $36^{th}$, $41^{st}$, $46^{th}$, $51^{st}$, and $56^{th}$ first-type-exclude-subframes of the 64 first-type-exclude-subframes (x=64) among the 10240 subframes in a single SFN (or DFN) period.

That is, subframes corresponding to subframe indices $y_{n1}$ and $y_{n2}$ in a single SFN (or DFN) period may be the second-type-exclude-subframes.

Here, it is defined that $y_{n1}$=$x_0$+160*$n_1$+1 and, n=0, 1, . . . , 63. Here, $x_0$ corresponds to an index of a first first-type-exclude-subframe (i.e., a subframe which an SLSS is initially transmitted) in a single SFN (or DFN) period.

Here, it is defined that $y_{n2}$=$x_0$+800*$n_2$+2 and, n=0, 1, . . . , 11.

Embodiment 2-2

76 second-type-exclude-subframes may be the last 76 subframes of 10240 subframes in a single SFN (or DFN) period.

When a first-type-exclude-subframe (i.e., an SLSS transmission subframe) does not exist between subframe index #10165 and subframe index #10240, subframe indices #10165, #10166, . . . , and #10240 may correspond to second-type-exclude-subframes.

That is, subframes corresponding to subframe indices $y_n$ in a single SFN (or DFN) period may be second-type-exclude-subframes. Here, it is defined that $y_n$=10240-n and that n=0, 1, . . . , 75.

When a first-type-exclude-subframe (i.e., an SLSS transmission subframe) exists between subframe index #10165 and subframe index #10240, subframe indices #10164, #10165, . . . , and #10240 may correspond to second-type-exclude-subframes.

That is, subframes corresponding to subframe indices $y_n$ in a single SFN (or DFN) period may be second-type-exclude-subframes. Here, when 10240-n>$x_{63}$, $y_n$=10240-n. Otherwise (i.e., when 10240-n≤$x_{63}$), $y_n$=10239-n and n=0, 1, . . . , 75. Here, $x_n$ indicates a first-type-exclude-subframe, and $x_{63}$ corresponds to a $64^{th}$ first-type-exclude-subframe.

Embodiment 2-3

76 second-type-exclude-subframes may be 64 subframes, which respectively follow immediately after first-type-exclude-subframes (i.e., SLSS transmission subframes) and the last 12 subframes of 10240 subframes in a single SFN (or DFN) period.

For example, 64 second-type-exclude-subframes among 76 subframes (y=76) may be determined to be subframes which respectively follow immediately after 64 first-type-exclude-subframes (x=64) of 10240 subframes in a single SFN (or DFN) period. The second-type-exclude-subframes may be expressed as subframe index $y_{n1}$.

Additionally, when a first-type-exclude-subframe (i.e., an SLSS transmission subframe) does not exist between subframe index #10229 and subframe index #10240, the remaining 12 second-type-exclude-subframes of the 76 subframes (y=76) may correspond to subframes corresponding to indices #10229, #10230, . . . , and #10240 in a single SFN (or DFN) period. When a first-type-exclude-subframe (i.e., an SLSS transmission subframe) exists between subframe index #10229 and subframe index #10240, subframe indices #10227, #10228, . . . , and #10240 may correspond to second-type-exclude-subframes. The second-type-exclude-subframes may be expressed as a subframe index $y_{n1}$.

That is, subframes corresponding to subframe indices $y_n$ and $y_{n2}$ in a single SFN (or DFN) period may be the second-type-exclude-subframes.

Here, $y_{n1}=x_0+160*n_1+1$, and $n=0, 1, \ldots, 63$, where $x_0$ corresponds to an index of a first first-type-exclude-subframe (i.e., a subframe in which an SLSS is initially transmitted) in a single SFN (or DFN) period.

Also, subframes corresponding to subframe indices $y_{n2}$ in a single SFN (or DFN) period may be the second-type-exclude-subframes. Here, it is defined that $y_{n2}=10240-n_2$ and, $n=0, 1, \ldots, 11$.

Alternatively, subframes corresponding to subframe indices $y_n$ in a single SFN (or DFN) period may be second-type-exclude-subframes. Here, when $10240-n_2>x_{63}$, $y_n=10240-n_2$. Otherwise (i.e., when $10240-n_2 \leq x_{63}$), $y_n=10238-n_2$ and $n_2=0, 1, \ldots, 11$. Here, $x_n$ indicates a first-type-exclude-subframe, and $x_{63}$ corresponds to a $64^{th}$ first-type-exclude-subframe.

Embodiment 3

The present embodiment relates to the case in which $L_{bitmap}=20$ and x=0. In this instance, y=0, as shown in Table 9. Accordingly, a subframe pool is determined to be $t^{SL}_k$ (here, $0 \leq k < (10240-0-0)$). That is, a first-type-exclude-subframe and a second-type-exclude-subframe may not exist, and a bitmap may be repeatedly applied to all subframes in a predetermined period. In this instance, a bitmap having a length of 20 is repeatedly applied to 10240 subframes, and thus, the number of target subframes to which the bitmap is to be applied (i.e., Tmax) may be an integer multiple of the length of the bitmap (e.g., the number of target subframes to which the bitmap is to be applied is divisible by the length of the bitmap).

Embodiment 4

The present embodiment relates to the case in which $L_{bitmap}=20$ and x=64. In this instance, y=16, as shown in Table 9. Accordingly, a subframe pool is determined to be $t^{SL}_k$ (here, $0 \leq k < (10240-64-16)$). That is, a bitmap may be repeatedly applied to subframes (i.e., a second subset) remaining after excluding subframes corresponding to x=64 and y=16. In this instance, a bitmap having a length of 20 is repeatedly applied to 10160 subframes, and thus, the number of target subframes to which the bitmap is to be applied (i.e., Tmax) may be an integer multiple of the length of the bitmap (e.g., the number of target subframes to which the bitmap is to be applied is divisible by the length of the bitmap).

Next, examples of a pattern of 16 second-type-exclude-subframes (y=16) will be described.

Embodiment 4-1

16 second-type-exclude-subframes may be subframes that respectively follow after some of first-type-exclude-subframes (i.e., SL SS transmission subframes).

For example, the 16 remaining second-type-exclude-subframes (y=16) may be determined to be subframes which respectively follow immediately after the $1^{st}$, $5^{th}$, $9^{th}$, $13^{th}$, $17^{th}$, $21^{st}$, $25^{th}$, $29^{th}$, $33^{th}$, $37^{th}$, $41^{st}$, $45^{th}$, $49^{th}$, $53^{th}$, $57^{th}$, and $61^{st}$ first-type-exclude-subframes among 64 first-type-exclude-subframes (x=64) of the 10240 subframes in a single SFN (or DFN) period.

That is, subframes corresponding to subframe indices $y_n$ in a single SFN (or DFN) period may be second-type-exclude-subframes. Here, it is defined that $y_n=x_0+640*n+1$ and, $n=0, 1, \ldots, 15$. Here, xo corresponds to an index of the first first-type-exclude-subframe (i.e., a subframe in which an SLSS is initially transmitted) in a single SFN (or DFN) period.

Embodiment 4-2

16 second-type-exclude-subframes may be the last 16 subframes of 10240 subframes in a single SFN (or DFN) period.

When a first-type-exclude-subframe (i.e., an SLSS transmission subframe) does not exist between subframe index #10225 and subframe index #10240, subframe indices #10225, #10226, . . . , and #10240 may correspond to second-type-exclude-subframes.

That is, the subframes corresponding to subframe indices $y_n$ in a single SFN (or DFN) period may be second-type-exclude-subframes. Here, it is defined that $y_n=10240-n$ and $n=0, 1, \ldots, 15$.

When a first-type-exclude-subframe (i.e., an SLSS transmission subframe) exists between subframe index #10225 and subframe index #10240, subframe indices #10224, #10225, . . . , and #10240 may correspond to second-type-exclude-subframes.

That is, the subframes corresponding to subframe indices $y_n$ in a single SFN (or DFN) period may be second-type-exclude-subframes. Here, when $10240-n>x_{63}$, $y_n=10240-n$. Otherwise (i.e., when $10240-n \leq x_{63}$), $y_n=10239-n$ and $n=0, 1, \ldots, 15$. Here, $x_n$ indicates a first-type-exclude-subframe, and $x_{63}$ indicates a $64^{th}$ first-type-exclude-subframe.

The embodiments 1 through 4 which are detailed embodiments of the method of FIG. 11 may additionally include features described in the following embodiments A or B, or the features corresponding to the embodiments 1 through 4 may be replaced with the features described in embodiments A or B.

Embodiment A

As described above, in operation S1120, the first UE may determine x first-type-exclude-subframes (i.e., subframes in which an SLSS resource is configured) based on the SLSS configuration information. Accordingly, the x first-type-exclude-subframes may be excluded from a set of all subframes belonging to a predetermined period (e.g., 10240 subframes which correspond to all subframes in a single SFN (or DFN) period). Here, the set of subframes remaining after excluding the x first-type-exclude-subframes from the set of all subframes may be referred to as a first subset. For example, x=0 or 64.

Subsequently, in operation S1130, the first UE may determine a second-type-exclude-subframe (i.e., an additional bitmap-non-applied-subframe) by taking into consideration the first subset, $L_{bitmap}$, and the like which have been determined in operation S1120. More specifically, the first UE determines whether to additionally exclude the second-type-exclude-subframe. When needed, the UE may determine the number of second-type-exclude-subframes. Accordingly, y second-type-exclude-subframes may be excluded from the first subset, and the result may be referred to as a second subset. For example, y=0, 16, 40, or 76.

Embodiment A-1

In the case of y=0 (in this instance, (X, $L_{bitmap}$) is (0, 20), (0, 16) or (64, 16) as shown in Table 9), y second-type-exclude-subframes (which are additionally reserved subframes that are not included in a subframe pool or that are not considered to be a subframe pool) do not exist when a subframe pool is configured by repeatedly applying a bitmap having a length of $L_{bitmap}$ in operation S1140. Accordingly, the locations of the y second-type-exclude-subframes may need to be defined.

Embodiment A-2

In the case of y=40 (in this instance, (X, $L_{bitmap}$) is (0, 100) as shown in Table 9), when a subframe pool is configured by repeatedly applying a bitmap having a length of $L_{bitmap}$ in operation 1140, 40 subframes may need to be defined as y second-type-exclude subframes, which are additionally reserved (i.e., subframes that are not included in a subframe pool or subframes that are not considered to be a subframe pool).

In this instance, the 40 second-type-exclude-subframes may exist at intervals of 256(=10240/40) subframes. For example, subframe indices #d, #(d+256), #(d+512), . . . , and #(d+9984) may correspond to the second-type-exclude-subframes. In this instance, d is an integer that satisfies 0≤d<256.

That is, subframes corresponding to subframe indices $y_n$ in a single SFN (or DFN) period may be second-type-exclude-subframes. Here, it is defined that $y_n$=d+256*n and n=0, 1, . . . , 39. One of the integer values that satisfy 0≤d<256 may be selected as d. For example, d may be 255 (d=255), but it is not limited thereto.

Embodiment A-3

In the case of y=76 (in this instance, (X, $L_{bitmap}$) is (64, 100) as shown in Table 9), when a subframe pool is configured by repeatedly applying a bitmap having a length of $L_{bitmap}$ in operation 1140, 76 subframes may need to be defined as y second-type-exclude-subframes, which are additionally reserved (i.e., subframes that are not included in a subframe pool or subframes that are not considered to be a subframe pool).

In this instance, the 76 second-type-exclude-subframes may exist at intervals of D subframes. For example, subframe indices #d, #(d+D), #(d+2D), . . . , and #(d+75*D) may correspond to the second-type-exclude-subframes. In this instance, d is an integer that satisfies 0≤d<D. In this instance, the interval D may be 134, which is obtained by dividing 10240 by 76 (i.e., int(10240/76)), whereby 76 second-type-exclude-subframes are evenly distributed over a total of 10240 subframes. However, the value is not limited thereto.

In this instance, when a second-type-exclude-subframe which is determined as described above overlaps a first-type-exclude-subframe (i.e., a subframe in which an SLSS is transmitted), that is, when the second-type-exclude-subframe has the same subframe index as that of the first-type-exclude-subframe, only with respect to the second-type-exclude-subframe that overlaps the first-type-exclude-subframe (the subframe in which SLSS transmission is performed), a subframe which is d' distant away from the subframe corresponding to the subframe index determined as described above may be determined to be a second-type-exclude-subframe. In this instance, 1≤d'<D. That is, in the case of d'=1, a subframe that overlaps a first-type-exclude-subframe (i.e., a subframe in which SLSS transmission is performed) may not be defined as a second-type-exclude-subframe; however, a subsequent subframe may be defined as a second-type-exclude-subframe.

In other words, subframes corresponding to subframe indices $y_n$ in a single SFN (or DFN) period may be second-type-exclude-subframes. Here, it is defined that $y_n$=d+D*n and n=0, 1, . . . , 75. One of the integer values that satisfy 0≤d<D may be selected as d. For example, d may be 133 (d=133), but it is not limited thereto. Also, D may be int(10240/76)=134, but it is not limited thereto. When a second-type-exclude-subframe defined by $y_n$=d+D*n overlaps a first-type-exclude-subframe (a subframe in which SLSS transmission is performed), a subframe that is d' subframes away from the corresponding second-type-exclude-subframe may be a second-type-exclude subframe, and 1≤d'<D. In this instance, d' may be 1 (d'=1), but it is not limited thereto.

Embodiment A-4

In the case of y=16 (in this instance, (X, $L_{bitmap}$) is (64, 20) as shown in Table 9), when a subframe pool is configured by repeatedly applying a bitmap having a length of $L_{bitmap}$ in operation 1140, 16 subframes may need to be defined as y second-type-exclude-subframes, which are additionally reserved subframes (i.e., subframes that are not included in a subframe pool or subframes that are not considered to be a subframe pool).

In this instance, the 16 second-type-exclude-subframes may exist at intervals of 640(=10240/16) subframes. For example, subframe indices #d, #(d+640), #(d+1280), . . . , and #(d+9600) may correspond to the second-type-exclude-subframes. In this instance, d is an integer that satisfies 0≤d<640.

In this instance, when a second-type-exclude-subframe determined as described above overlaps a first-type-exclude-subframe (i.e., a subframe in which an SLSS is transmitted), that is, when the second-type-exclude-subframe has the same subframe index as that of the first-type-exclude-subframe, only with respect to the second-type-exclude-subframe that overlaps the first-type-exclude-subframe (i.e., a subframe in which SLSS transmission is performed), a subframe which is d' distant away from the subframe corresponding to the subframe index determined as described above may be determined to be a second-type-exclude-subframe. In this instance, 1≤d'<640. That is, in the case of d'=1, when a subframe overlaps a first-type-exclude-subframe (i.e., a subframe in which SLSS transmission is performed), it may not be defined as a second-type-exclude-subframe; however, a subsequent subframe may be defined as a second-type-exclude-subframe.

In other words, subframes corresponding to subframe indices $y_n$ in a single SFN (or DFN) period may be second-type-exclude-subframes. Here, it is defined that $y_n$=d+640*n and n=0, 1, . . . , 15. One of the integer values that satisfies 0≤d<640 may be selected as d. For example, d may be 639 (d=639), but it is not limited thereto. When a second-type-exclude-subframe defined by $y_n$=d+D*n overlaps a first-type-exclude-subframe (i.e., a subframe in which SLSS transmission is performed), a subframe that is d' subframes away from the corresponding second-type-exclude-subframe may be a second-type-exclude subframe, and 1≤d'<640. In this instance, d' may be 1 (d'=1), but it is not limited thereto.

According to the above described embodiments A-2 to A-4, when y is different from 0 and when y second-type-exclude-subframes therefore need to be defined, the locations of the second-type-exclude-subframes may be determined as follows.

The y second-type-exclude-subframes may exist at intervals of D subframes. For example, subframe indices #d, #(d+D), #(d+2D), . . . , and #(d+(y-1)*D) may correspond to the second-type-exclude-subframes. In this instance, d is an integer that satisfies 0≤d<D, where the interval D is a value which is obtained by dividing 10240 by y (i.e., int(10240/y)), whereby the y second-type-exclude-subframes are evenly distributed over a total of 10240 subframes.

In this instance, when a second-type-exclude-subframe which is determined as described above overlaps a first-type-exclude-subframe (i.e., a subframe in which an SLSS is transmitted), that is, when the second-type-exclude-subframe has the same subframe index as that of the first-type-exclude-subframe), only with respect to the second-type-exclude-subframe that overlaps the first-type-exclude-subframe (i.e., a subframe in which SLSS transmission is performed), a subframe which is d' distant away from the subframe corresponding to the subframe index determined as described above may be determined to be a second-type-exclude-subframe. In this instance, 1≤d'<D. That is, in the case of d'=1, when a subframe overlaps a first-type-exclude-subframe (i.e., a subframe in which SLSS transmission is performed), it may not be defined as a second-type-exclude-subframe, but a subsequent subframe may be defined as a second-type-exclude-subframe.

In other words, subframes corresponding to subframe indices $y_n$ in a single SFN (or DFN) period may be second-type-exclude-subframes. Here, it is defined that $y_n$=d+D*n and n=0, 1, . . . , y-1. One of the integer values that satisfies 0≤d<D may be selected as d. For example, d may be D-1 (d=D-1), but it is not limited thereto. Also, D may be int(10240/y), but it is not limited thereto. When a second-type-exclude-subframe defined by $y_n$=d+D*n overlaps a first-type-exclude-subframe (i.e., a subframe in which SLSS transmission is performed), a subframe that is d' subframes away from the corresponding second-type-exclude-subframe may be a second-type-exclude subframe, and 1≤d'<D. In this instance, d' may be 1 (d'=1), but it is not limited thereto.

Embodiment B

In addition to Frequency Division Duplexing (FDD), embodiment B takes Time Division Duplexing (TDD) into consideration as a duplexing scheme.

When using TDD, Table 9 may be replaced with Table 10 as shown below.

TABLE 10

| Duplexing | Z | x | $L_{bitmap}$ | y |
|---|---|---|---|---|
| FDD | 10240 | 0 | 100 | 40 |
|  |  | 0 | 20 | 0 |
|  |  | 0 | 16 | 0 |
|  |  | 64 | 100 | 76 |
|  |  | 64 | 20 | 16 |
|  |  | 64 | 16 | 0 |
| TDD UL-DL configuration 0 | 6144 | 0 | 100 | 44 |
|  |  | 0 | 20 | 4 |
|  |  | 0 | 16 | 0 |
|  |  | 64 | 100 | 80 |
|  |  | 64 | 20 | 0 |
|  |  | 64 | 16 | 0 |

TABLE 10-continued

| Duplexing | Z | x | $L_{bitmap}$ | y |
|---|---|---|---|---|
| TDD UL-DL configuration 1 | 4096 | 0 | 100 | 96 |
|  |  | 0 | 20 | 16 |
|  |  | 0 | 16 | 0 |
|  |  | 64 | 100 | 32 |
|  |  | 64 | 20 | 12 |
|  |  | 64 | 16 | 0 |
| TDD UL-DL configuration 2 | 2048 | 0 | 100 | 48 |
|  |  | 0 | 20 | 8 |
|  |  | 0 | 16 | 0 |
|  |  | 64 | 100 | 84 |
|  |  | 64 | 20 | 4 |
|  |  | 64 | 16 | 0 |
| TDD UL-DL configuration 3 | 3072 | 0 | 100 | 72 |
|  |  | 0 | 20 | 12 |
|  |  | 0 | 16 | 0 |
|  |  | 64 | 100 | 8 |
|  |  | 64 | 20 | 8 |
|  |  | 64 | 16 | 0 |
| TDD UL-DL configuration 4 | 2048 | 0 | 100 | 48 |
|  |  | 0 | 20 | 8 |
|  |  | 0 | 16 | 0 |
|  |  | 64 | 100 | 84 |
|  |  | 64 | 20 | 4 |
|  |  | 64 | 16 | 0 |
| TDD UL-DL configuration 5 | 1024 | 0 | 100 | 24 |
|  |  | 0 | 20 | 4 |
|  |  | 0 | 16 | 0 |
|  |  | 64 | 100 | 60 |
|  |  | 64 | 20 | 0 |
|  |  | 64 | 16 | 0 |
| TDD UL-DL configuration 6 | 5120 | 0 | 100 | 20 |
|  |  | 0 | 20 | 0 |
|  |  | 0 | 16 | 0 |
|  |  | 64 | 100 | 56 |
|  |  | 64 | 20 | 16 |
|  |  | 64 | 16 | 0 |

In operation S1120, as described above, a first UE may determine x first-type-exclude-subframes (i.e., subframes in which an SLSS resource is configured) based on the SLSS configuration information. Accordingly, x first-type-exclude-subframes may be excluded from a set of all uplink subframes included in a predetermined period (e.g., z subframes corresponding to all uplink subframes included in a single SFN (or DFN) period (z may change according to the FDD and TDD UL-DL configuration as shown in Table 10)). Here, the set of subframes remaining after excluding the x first-type-exclude-subframes from the set of all subframes may be referred to as a first subset. For example, x=0 or 64.

Subsequently, in operation S1130, the first UE may determine a second-type-exclude-subframe (i.e., an additional bitmap-non-applied-subframe) by taking into consideration the first subset, $L_{bitmap}$, and the like determined in operation S1120. Here, the first UE determines whether to additionally exclude the second-type-exclude-subframe. When needed, the first UE may determine the number of second-type-exclude-subframes. Accordingly, y second-type-exclude-subframes may be excluded from the first subset, and the result may be referred to as a second subset. For example, y may be a value corresponding to each case of Table 10.

In the case of y=0, when a subframe pool is configured by repeatedly applying a bitmap having a length of $L_{bitmap}$ in operation 1140, y second-type-exclude-subframes, which in this case are additionally reserved subframes (i.e., subframes that are not included in a subframe pool or subframes that are not considered to be a subframe pool), do not exist. Thus, there is no need to define the locations of the y second-type-exclude-subframes.

When y is different from 0 and y second-type-exclude-subframes need to be defined, the locations of the y second-type-exclude-subframes may be determined as follows.

The y second-type-exclude-subframes may exist at intervals of D subframes. For example, subframe indices #d, #(d+D), #(d+2D), . . . , and #(d+(y-1)*D) may correspond to the second-type-exclude-subframes. In this instance, d is an integer that satisfies 0≤d<D. In this instance, the interval D may be a value which is obtained by dividing 10240 by y (i.e., int(10240/y)), whereby they second-type-exclude-subframes are evenly distributed over a total of 10240 subframes.

In this instance, when a second-type-exclude-subframe determined as described above overlaps a first-type-exclude-subframe (that is, when the second-type-exclude-subframe has the same subframe index as that of the first-type-exclude-subframe) or when the determined second-type-exclude subframe is not an uplink subframe, only with respect to the second-type-exclude-subframe that overlaps the first-type-exclude-subframe (the subframe in which SLSS transmission is performed) or the second-type-exclude subframe that is not an uplink subframe, a subframe, which is not the first-type-exclude-subframe, but is an uplink subframe and is the closest subframe from among subframes subsequent to the subframe determined as described above, may be determined to be a second-type-exclude-subframe.

In other words, subframes corresponding to subframe indices $y_n$ in a single SFN (or DFN) period may be second-type-exclude-subframes. Here, it is defined that $y_n=d+D*n$ and n=0, 1,. . . , y-1. One of the integer values that satisfies 0≤d<D may be selected as d. For example, d may be an uplink subframe which is the closest to a subframe having a subframe index value of D, from among subframes prior to the subframe having the subframe index value of D. However, the value is not limited thereto. Similarly, D may be int(10240/y), but it is not limited thereto. When a second-type-exclude-subframe defined by the equation $y_n=d+D*n$ overlaps a first-type-exclude subframe (i.e., a subframe in which SLSS transmission is performed) or is not an uplink subframe, a subframe, which is different from a first-type-exclude subframe, is an uplink subframe, and is the closest subframe from among subframes subsequent to the second-type-exclude-subframe defined by the equation $y_n=d+D*n$ may be defined as a second-type-exclude-subframe.

Figure 12:
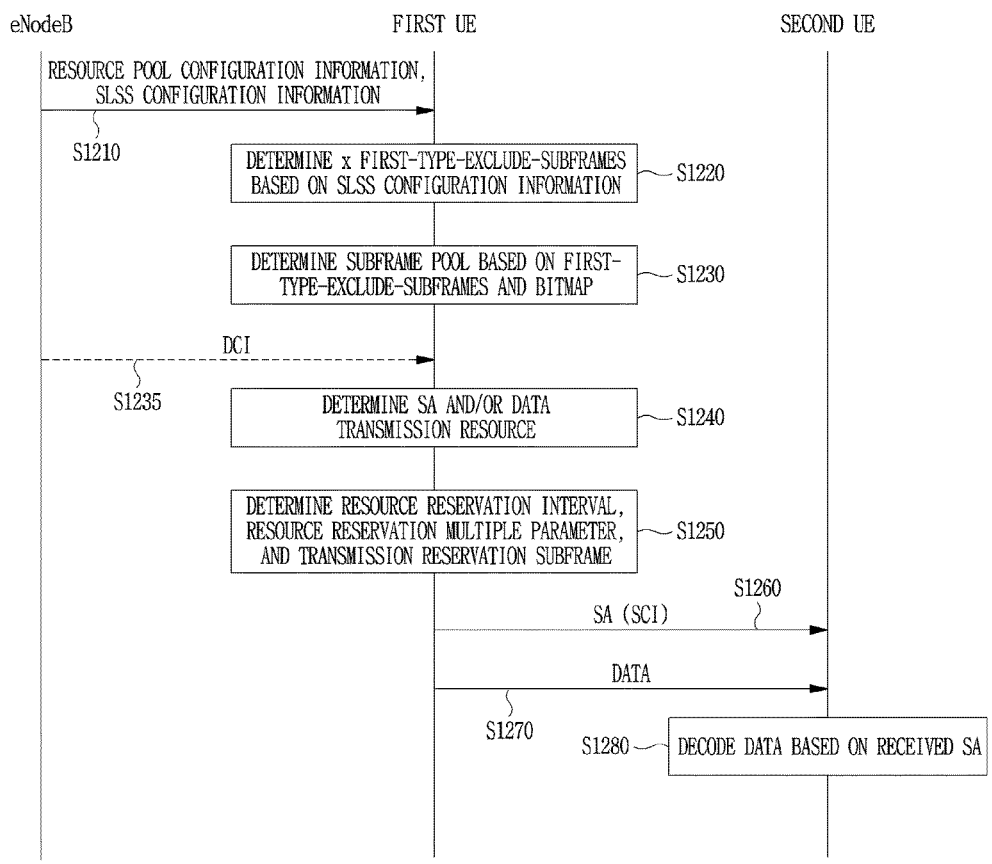
FIG. 12 is a flowchart illustrating a method for determining a resource pool.

FIG. 12 is a flowchart illustrating a method of determining a resource pool.

In the example of FIG. 12, a first UE and a second UE correspond to UEs that join in V2X communication or direct link communication, wherein the first UE corresponds to an SA and data Tx UE, and the second UE corresponds to an SA and data Rx UE.

In operation S210, an eNodeB may transmit resource pool configuration information for V2X communication, SLSS configuration information, and the like to the first UE. If the eNodeB transmits the information through higher layer signaling, the resource pool configuration information may correspond to "subframe indication of resource pool" information including a bitmap having a length of $L_{bitmap}$. Also, the SLSS configuration information may correspond to "SL V2V synchronization configuration" information (i.e., configuration information associated with whether a UE transmits and receives synchronization information associated with a sidelink for V2V).

In operation S1220, the first UE may determine x first-type-exclude-subframes (i.e., subframes in which an SLSS resource is configured) based on the SLSS configuration information. Accordingly, the x first-type-exclude-subframes may be excluded from a set of all subframes belonging to a predetermined period (e.g., 10240 subframes which correspond to all subframes in a single SFN (or DFN) period). Here, the set of subframes remaining after excluding the x first-type-exclude-subframe from the set of all subframes may be referred to as a first subset. For example, x=0 or 64.

In operation S1230, the first UE may repeatedly apply a bitmap having the length of $L_{bitmap}$ received in operation S1210 to the set of subframes (i.e., a first subset) remaining after excluding the x first-type-exclude-subframes from the set of all subframes determined in operation S1220. That is, unlike the example shown in FIG. 11 which takes into consideration a second-type-exclude-subframe, the example shown in FIG. 12 does not take into consideration a second-type-exclude-subframe (e.g., it does not define a second-type-exclude-subframe or assumes that the number of second-type-exclude-subframes is 0 (y=0)), and applies a bitmap after excluding a first-type-exclude-subframe.

Operation S1235 may be performed when the first UE is set to operate in the eNodeB resource scheduling mode (mode 3), and may be omitted when the first UE is set to operate in the UE autonomous resource selection mode (mode 4). In operation S1235, the eNobeB may transmit DCI to the first UE, including scheduling information (or grant information) of SA and/or data transmission.

In operation S1240, when the first UE is set to operate in the eNodeB resource scheduling mode (mode 3), the first UE may determine a resource (e.g., a subframe and a subchannel) to be used for transmitting SA and/or data to the second UE based on the DCI received from the eNodeB. When the first UE is set to operate in the UE autonomous resource selection mode (mode 4), the UE may autonomously determine a resource to be used for transmitting SA and/or data to the second UE. As an example, the first UE may determine a resource through which SA and/or data is to be transmitted by taking into consideration the state of channel occupancy by a sensing window in a predetermined interval prior to the point in time when a TB to be transmitted to the second UE has been generated.

In operation S1250, the first UE determines a resource reservation interval ($P_{rsvp}$) and a resource reservation multiple parameter (j), and may determine transmission reservation subframes based thereon.

A fixed value (e.g., $P_{rsvp}=100$) may always be used as $P_{rsvp}$ in operation S1250, or one selected from among a plurality of values may be used as $P_{rsvp}$.

When one fixed value is always used as $P_{rsvp}$, $P_{rsvp}$ may always be 100 irrespective of the value of $L_{bitmap}$ (16, 20, or 100).

When a value selected from among the plurality of values is used as $P_{rsvp}$, $P_{rsvp}$ may be directly indicated by higher layer signaling. $P_{rsvp}$ may be determined in connection with $L_{bitmap}$. Further, $P_{rsvp}$ may be determined based on $L_{bitmap}$ and on information associated with whether a short resource reservation period is used.

When one value selected from among a plurality of values is used as $P_{rsvp}$ and when $P_{rsvp}$ is indicated directly by higher layer signaling, either 25 (if the reservation period is short) or 100 may be selected as $P_{rsvp}$, irrespective of the value of $L_{bitmap}$ (16, 20, or 100).

When one value selected from among a plurality of values is used as $P_{rsvp}$ and when $P_{rsvp}$ is determined in connection with $L_{bitmap}$, an eNodeB may directly transmit the value of $P_{rsvp}$ determined in connection with $L_{bitmap}$ (or a value indicating a combination of $P_{rsvp}$ and $L_{bitmap}$) to the first UE. Further, the first UE may autonomously determine the value of $P_{rsvp}$ associated with the value of $L_{bitmap}$ based on the value of $L_{bitmap}$ received from the eNodeB in operation S1210. The value of $P_{rsvp}$ associated with the value of $L_{bitmap}$ may be determined as shown in Table 11 below. In this instance, when the value of $P_{rsvp}$ is a multiple of 16, the value may be 16, 32, 96, or 112, wherein 16 and 32 are multiples of 16 that are close to 25 (if the reservation period is short), and 96 and 112 are multiples of 16 that are close to 100. However, the value is not limited thereto.

TABLE 11

| $L_{bitmap}$ | $P_{rsvp}$ |
| --- | --- |
| 100 | 100 |
| 20 | 100 |
| 16 | One of values corresponding to multiples of 16 |

When one value selected from among a plurality of values is used as $P_{rsvp}$, and when $P_{rsvp}$ is determined based on $L_{bitmap}$ and on information associated with whether a short resource reservation period is used, the eNodeB may directly transmit the value of $P_{rsvp}$, which is determined based on $L_{bitmap}$ and on information associated with whether a short resource reservation period is used, to the first UE. As a second option, the eNodeB may directly transmit a value indicating the combination of the information associated with whether a short resource reservation period is used and $L_{bitmap}$. Further, the first UE may autonomously determine the value of $P_{rsvp}$ in association with the information associated with whether a short resource reservation period is used and $L_{bitmap}$ based on the information associated with whether a short resource reservation period is used (information whether a short reservation period is used or not may be indicated by the eNodeB through higher layer signaling such as RRC or the like) and $L_{bitmap}$ received from the eNodeB in operation S1110.

To provide one example, the value of $P_{rsvp}$ in association with the value of $L_{bitmap}$ and with whether a short reservation period is used may be determined as shown in Table 12. In this instance, when the value of $P_{rsvp}$ is one of the values corresponding to multiples of 16 in Table 12, the value may be either 16 or 32, which are multiples of 16 that are close to 25, when a short reservation period is used, or the value may be either 96 or 112, which are multiples of 16 that are close to 100, when a short reservation period is not used. However, the value is not limited thereto.

TABLE 12

| Short reservation period | $L_{bitmap}$ | $P_{rsvp}$ |
| --- | --- | --- |
| Not used | 100 | 100 |
| Not used | 20 | 100 |
| Not used | 16 | One of values corresponding to multiples of 16 |
| Used | 100 | 25 |
| Used | 20 | 25 |
| Used | 16 | One of values corresponding to multiples of 16 |

As described above, even when $L_{bitmap}=16$, 100 may be used as the value of $P_{rsvp}$. However, in the case of $L_{bitmap}=16$, when a bitmap having a length of 16 bits is ($b_0$, $b_1$, $b_2$, ..., $b_{15}$), $P_{rsvp}=100$. Accordingly, subframes in units of multiples of 100 may or may not belong to a single subframe pool. The bit values of ($b_0$, $b_4$, $b_8$, $b_{12}$) need to always be the same. In the same manner, the bit values of ($b_1$, $b_5$, $b_9$, $b_{13}$) needs to always be the same. The bit values of ($b_2$, $b_6$, $b_{10}$, $b_{14}$) need to always be the same. The bit values of ($b_3$, $b_7$, $b_{11}$, $b_{15}$) need to always be the same. This is merely a four-bit bitmap repeated four times, as opposed to a 16-bit bitmap. Therefore, the configuration of a bitmap may have restrictions.

Even there are restrictions, in order to set the resource reservation interval $P_{rsvp}$ to be $P_{rsvp}$ the same in all cases, the value of $P_{rsvp}$, which is the same as the value of ($P_{rsvp}=100$) when $L_{bitmap}=20$ or 100, may be used when $L_{bitmap}=16$.

Alternatively, to overcome restrictions: when 100 subframes correspond to $P_{rsvp}=100$, a bitmap ($b_0$, $b_1$, $b_2$, $b_{15}$) having a length of 16 in the case of $L_{bitmap}=16$, is applied six times and only a part ($b_0$, $b_1$, $b_2$, $b_3$) is applied with respect to the last four subframes. With respect to subsequent sets of 100 subframes, the bitmap ($b_0$, $b_1$, $b_2$, ..., $b_{15}$) having a length of 16 is applied six times and only front four bits ($b_0$, $b_1$, $b_2$, $b_3$) of the bitmap are applied with respect to the last four subframes, in the same manner as described above. In this manner, when the bitmap having a length of 16 is applied with respect to 10240 subframes included in a single SFN (or DFN) period for every 100 subframes, as described above, the above restriction may not exist. However, it is the same as the case in which a bit value is applied based on a 100-subframe period. Therefore, ambiguity attributable to SFN (or DFN) wrap-around may occur, as in the case of $L_{bitmap}=20$ or 100.

Therefore, in the case of $L_{bitmap}=16$, one of the multiples of 16 may be set as $P_{rsvp}$ as described above to overcome the above restriction. In this instance, the restriction caused when $P_{rsvp}$ is indivisible by $L_{bitmap}$ may be overcome, and at the same time, ambiguity attributable to SFN (or DFN) wrap-around may not be generated because the the total number of subframes in a single SFN (or DFN) period (10240) is divisible by the value of $L_{bitmap}$ (16). However, in this instance, the resource reservation interval $P_{rsvp}$ must be set to be different from the case of $L_{bitmap}=20$ or 100. Therefore, the number of events, which are needed to be taken into consideration in a resource reservation process, may be increased.

Also, the first UE may determine a resource reservation multiple parameter j based on the length $L_{bitmap}$ of a bitmap and/or on the number of first-type-exclude-subframes (x). Here, whether a resource will be reserved beyond a single predetermined period (e.g., a SFN period or a DFN period) may be determined based on j (=1, 2, ..., $C_{resel}$-1). That is, whether an SFN (or DFN) wrap-around situation will occur may be determined. The maximum value (upper limit) of j associated with the value of $L_{bitmap}$ may be determined as shown in Table 13 or Table 14.

TABLE 13

| $L_{bitmap}$ | x | $C_{resel}$ |
| --- | --- | --- |
| 100 | 0 | 6*SL_RESOURCE_RESELECTION_COUNTER |
| 100 | 64 | 6*SL_RESOURCE_RESELECTION_COUNTER |
| 20 | 0 | 10*SL_RESOURCE_RESELECTION_COUNTER |
| 20 | 64 | 6*SL_RESOURCE_RESELECTION_COUNTER |
| 16 | 0 | 10*SL_RESOURCE_RESELECTION_COUNTER |
| 16 | 64 | 10*SL_RESOURCE_RESELECTION_COUNTER |

TABLE 14

| $L_{bitmap}$ | $C_{resel}$ |
| --- | --- |
| 100 | 6*SL_RESOURCE_RESELECTION_COUNTER |
| 20 | 6*SL_RESOURCE_RESELECTION_COUNTER |
| 16 | 10*SL_RESOURCE_RESELECTION_COUNTER |

In the examples described in Table 13 and Table 14, when the value of $L_{bitmap}$ is 100, the upper limit of j may be lowered to j=1, 2, . . . , 6*SL_RESOURCE_RESELECTION_COUNTER-1 because an SFN (or DFN) wrap-around situation needs to be avoided irrespective of x.

In the example described in Table 13, when the value of $L_{bitmap}$ is 20 and when x=64, the upper limit of j may be lowered to j=1, 2, . . . , 6*SL_RESOURCE_RESELECTION_COUNTER-1 because an SFN (or DFN) wrap-around situation needs to be avoided.

In the example described in Table 13, when the value of $L_{bitmap}$ is 20 and x=0, ambiguity does not exist even though an SFN (or DFN) wrap-around situation does occur, and the sequence j=1, 2, . . . , 10*SL_RESOURCE_RESELECTION_COUNTER-1 may be applied.

Alternatively, as shown in Table 14, when the value of $L_{bitmap}$ is 20, it is assumed that an SFN (or DFN) wrap-around situation does not occur irrespective of x. In this instance, the sequence j=1, 2, . . . , 6*SL_RESOURCE_RESELECTION_COUNTER-1 may be applied.

In the examples of Table 13 and Table 14, when the value of $L_{bitmap}$ is 16, ambiguity does not exist even though an SFN (or DFN) wrap-around situation does occur, whereby j=1, 2, . . . , 10*SL_RESOURCE_RESELECTION_COUNTER-1 may be applied.

In operations S1260 and S1270, the first UE may map SA and data to the resource determined in operation S1240, and may transmit the same to the second UE. For example, in operation S1260, the first UE may transmit SA corresponding to SCI to the second UE. In operation S1270, the first UE may transmit data to the second UE in a resource indicated by the SCI transmitted in operation S1260.

In operation S1280, the second UE may attempt to receive the SA from the first UE according to a blind decoding scheme. The blind decoding scheme may include monitoring the locations of candidate resources through which SA may be received. In addition, the second UE may determine the resource in which data is to be received based on the SCI received from the first UE, and may attempt to decode the data transmitted from the first UE.

Although the above described illustrative methods of FIG. 12 are expressed as a series of operations, the order of operations executed is not limited to those described. The operations may additionally be executed in parallel or in a different order. In order to implement the system described above, other operations may be added to the described operations, only some operations may be performed while excluding others, or some operations may be excluded while additional other operations may be included.

Next, more detailed examples associated with FIG. 12 will be described.

According to a feature of the example shown in FIG. 12, the selection of a combination of $L_{bitmap}$ and $P_{rsvp}$ may be restricted, and the upper limit of a resource reservation multiple parameter j may be set, by taking into consideration whether an SFN (or DFN) wrap-around occurs.

Embodiment 5

The present embodiment relates to the case in which $L_{bitmap}$=16 and x=0. In this instance, a subframe pool is determined to be $t^{SL}_k$ (here,0≤k<(10240-0)). That is, a first-type-exclude-subframe and a second-type-exclude-subframe may not exist, and a bitmap may be repeatedly applied to all subframes in a predetermined period. In this instance, a bitmap having a length of 16 is repeatedly applied to 10240 subframes, and thus, the number of target subframes to which the bitmap is to be applied (i.e., Tmax) may be an integer multiple of the length of the bitmap (i.e., the number of target subframes to which the bitmap is to be applied is divisible by the length of the bitmap).

In addition, the value of $P_{rsvp}$ may be set to an appropriate value for controlling a resource reservation period. As described above, a fixed value (e.g., $P_{rsvp}$=100) may always be used as $P_{rsvp}$ or one selected from among a plurality of values may be used as $P_{rsvp}$. When a value selected from among the plurality of values is used, $P_{rsvp}$ may be directly indicated by higher layer signaling. Otherwise, $P_{rsvp}$ may be determined in connection with $L_{bitmap}$, or $P_{rsvp}$ may be determined based on $L_{bitmap}$ and on information associated with whether a short resource reservation period is used.

Embodiment 6

The present embodiment relates to the case in which $L_{bitmap}$=16 and x=64. In this instance, a subframe pool is determined to be $t^{SL}_k$ (here,0≤k<(10240-64)). That is, a bitmap may be repeatedly applied to a first subset that takes into consideration 64 first-type-exclude-subframes (x=64) (here, a second-type-exclude-subframe does not exist). In this example, a bitmap having a length of 16 is repeatedly applied to 10176 subframes, and thus, the number of target subframes to which the bitmap is to be applied (i.e., Tmax) may be an integer multiple of the length of the bitmap (i.e., the number of target subframes to which the bitmap is to be applied is divisible by the length of the bitmap).

Here too, the value of $P_{rsvp}$ may be set to an appropriate value for controlling a resource reservation period. As described above, a fixed value (e.g., $P_{rsvp}$=100) may always be used as $P_{rsvp}$ or one selected from among a plurality of values may be used as $P_{rsvp}$. When a value selected from among the plurality of values is used, $P_{rsvp}$ may be directly indicated by higher layer signaling. Otherwise, $P_{rsvp}$ may be determined in connection with $L_{bitmap}$, or $P_{rsvp}$ may be determined based on $L_{bitmap}$ and on information associated with whether a short resource reservation period is used.

The various embodiments of the present disclosure are not described here merely for enumerating all possible combinations. Rather, they describe representative aspects of the present disclosure, and subjects described in the various embodiments may be applied independently or in combination of two or more subjects.

In addition, the various embodiments of the present disclosure may be implemented by hardware, firmware, software, a combination thereof, or the like. In the case of hardware, the various embodiments of the present disclosure may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), a general processor, a controller, a micro-controller, a micro-processor, and the like.

The scope of the present disclosure includes software or machine-executable instructions (e.g., an operating system, an application, firmware, a program, and the like) which enable operations according to the methods of various embodiments to be performed in a device or a computer. The scope also includes a device that stores such software, instructions, or the like, or a non-transitory computer-readable medium which is executable on a computer.

Figure 13:
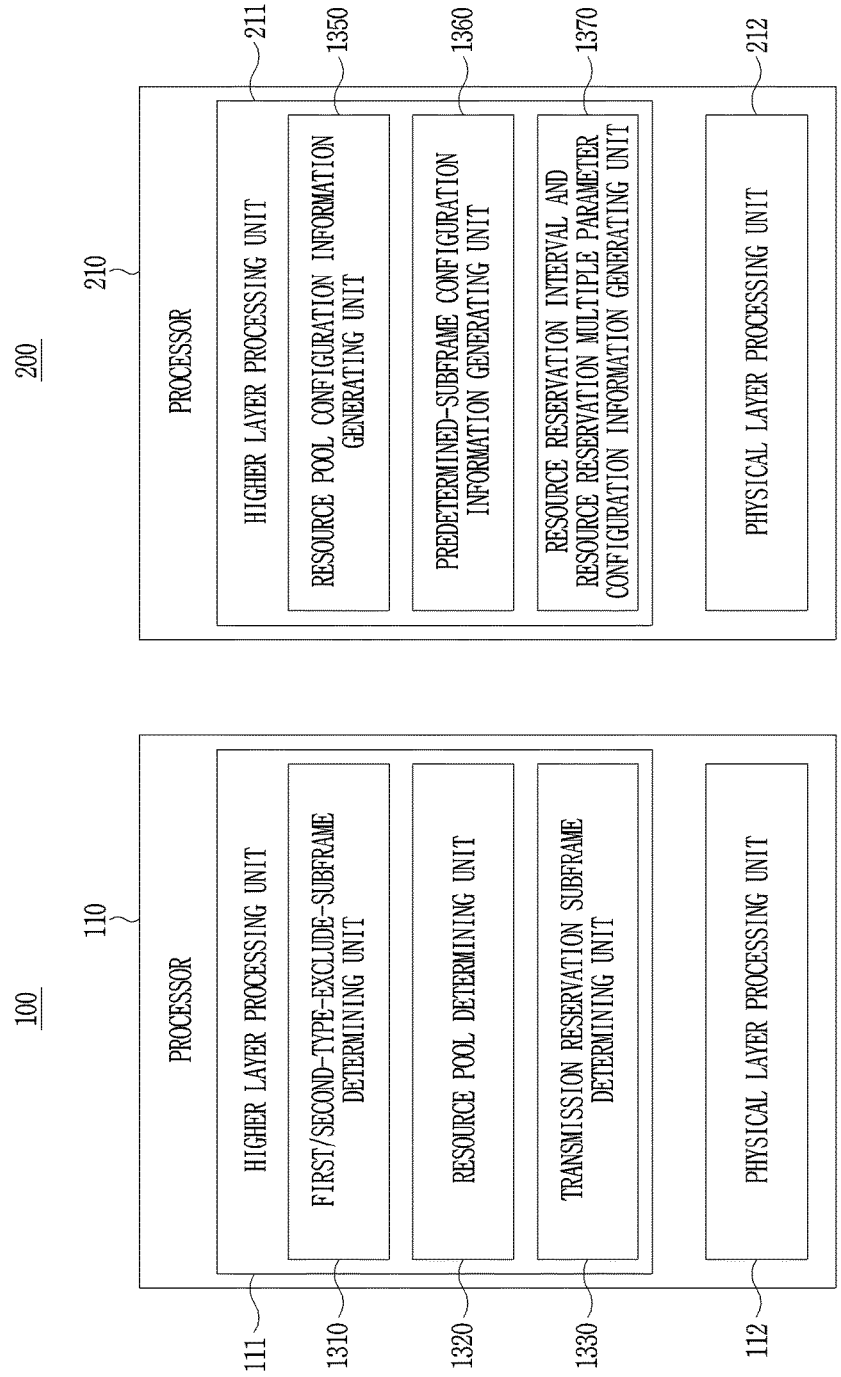
FIG. 13 is a diagram illustrating the configuration of a wireless device.

FIG. 13 is a diagram illustrating the configuration of a wireless device.

FIG. 13 illustrates a UE 100 that transmits control information and data for V2X communication or direct link (e.g., D2D, ProSe, or SL) communication to another UE, and an eNodeB 200 that provides control information to the UE 100 for the purpose of supporting V2X communication or direct link (e.g., D2D, ProSe, or SL) communication.

The UE 100 may include a processor 110, an antenna unit 120, a transceiver 130, and memory 140.

The processor 110 processes signals related to a baseband, and may include a higher layer processing unit 111 and a physical layer processing unit 112. The higher layer processing unit 111 may process the operations of a Medium Access Control (MAC) layer, a Radio Resource Control (RRC) layer, or a higher layer. The physical layer processing unit 112 may process the operations of a PHY layer (e.g., processing an uplink transmission signal or processing a downlink reception signal). The processor 110 may control operation of the UE 100 in addition to processing signals related to a baseband.

The antenna unit 120 may include one or more physical antennas, and may support Multiple Input Multiple Output (MIMO) transmission/reception when a plurality of antennas is included. The transceiver 130 may include a Radio Frequency (RF) transmitter and an RF receiver. The memory 140 may store information processed by the processor 110 as well as software, an operating system (OS), applications, or the like associated with the operations of the UE 100; the memory may additionally include elements such as a buffer or the like.

The eNodeB 200 may include a processor 210, an antenna unit 220, a transceiver 230, and a memory 240.

The processor 210 processes signals related to a baseband, and may include a higher layer processing unit 211 and a physical layer processing unit 212. The higher layer processing unit 211 may process the operations of an MAC layer, an RRC layer, or a higher layer. The physical layer processing unit 212 may process the operations of a PHY layer (e.g., processing a downlink transmission signal or processing an uplink reception signal). The processor 210 may control operation of the eNodeB 200 in addition to processing signals related to a baseband.

The antenna unit 220 may include one or more physical antennas, and may support MIMO transmission/reception when a plurality of antennas is included. The transceiver 230 may include an RF transmitter and an RF receiver. The memory 240 may store information processed by the processor 210 as well as software, an OS, applications, or the like associated with the operations of the eNodeB 200; the memory may additionally include elements such as a buffer or the like.

The processor 110 of the UE 100 may be configured to implement the operations of a UE, which have been described in all of the embodiments of the present disclosure.

For example, the higher layer processing unit 111 of the processor 110 of the UE 100 may include a first/second-type-exclude-subframe determining unit 1310, a resource pool determining unit 1230, and a transmission reservation subframe determining unit 1330.

The first/second-type-exclude-subframe determining unit 1310 may determine a first-type-exclude-subframe based on predetermined subframe configuration information (e.g., SLSS configuration information) received from an eNodeB. The first/second-type-exclude-subframe determining unit 1310 may also determine whether a second-type-exclude-subframe is needed, and may determine the number of second-type-exclude-subframes and the locations thereof (or a pattern thereof) when a second-type-exclude-subframe is needed.

The resource pool determining unit 1320 may determine a subframe pool by repeatedly applying bitmap information to the subframes (e.g., a second sub-set) remaining after excluding first/second-type-exclude-subframes from all subframes included in a predetermined period (e.g., a SFN period or DFN period). The predetermined period is based on resource pool configuration information (e.g., bitmap information) received from an eNodeB.

When SA and/or data to be transmitted to another UE exists, one UE 100 may transmit that SA and/or data to another UE in one or more subframes of the subframe pool through the physical layer processing unit 112.

A transmission reservation subframe determining unit 1330 may determine a subframe having an index value of $m+P_{rsvp}*j$, based on index m of a subframe where SA and/or data transmission is performed.

Herein, as described in the various embodiments of the present disclosure, the number of second-type-exclude-subframes, the pattern of second-type-exclude-subframes, a resource reservation multiple parameter (j), and the like may be determined by taking into consideration the length of a bitmap, the number of first-type-exclude-subframes, a resource reservation interval ($P_{rsvp}$), and the like.

The physical layer processing unit 112 of the processor 110 of the UE 100 may receive information from the eNodeB 200, such as DCI or the like, and may deliver the same to the higher layer processing unit 111, or may transmit control information and data to another UE (not illustrated).

The processor 210 of the eNodeB 200 may be configured to implement operations of the eNodeB which have been described in the embodiments of the present disclosure.

For example, the higher layer processing unit 211 of the processor 210 in the eNodeB 200 may include a resource pool configuration information generating unit 1350, a predetermined-subframe configuration information generating unit 1360, and a resource reservation interval and resource reservation multiple parameter configuration information generating unit 1370.

The resource pool configuration information generating unit 1350 may generate information including bitmap information and the like.

The predetermined-subframe configuration information generating unit 1360 may generate information associated with an SLSS configuration subframe, which the UE 100 regards as a first-type-exclude-subframe.

The resource reservation interval and resource reservation multiple parameter configuration information generating unit 1370 may generate information required for setting a resource reservation interval ($P_{rsvp}$), a resource reservation multiple parameter (j), and the like, which are required when the UE 100 determines a transmission reservation subframe $m+P_{rsvp}*j$.

As described above, the information generated by the higher layer processing unit 211 may be transferred in the form of higher layer signaling to the UE 100 through the physical layer processing unit 212.

A mobile device, e.g., a V2X UE, may perform a process of determining a resource pool for a sidelink transmission. For example, the mobile device may receive, from an eNB, resource pool configuration information, the resource pool configuration information comprising a bitmap to determine the resource pool, determine, for a period having a plurality of consecutive subframes, a first subset of subframes by excluding, from the plurality of consecutive subframes, subframes in which a sidelink synchronization signal (SLSS) resource is configured; and subframes other than uplink subframes. The mobile device may determine, for the period, a second subset of subframes by excluding, from the first subset of subframes, one or more subframes, wherein a quantity of the second subset of subframes corresponds to an integer multiple of a length of the bitmap, and determine, based on a plurality of repetitions of the bitmap, the resource pool for a sidelink transmission from the second subset of subframes.

The mobile device may receive, from the eNB, a downlink control information (DCI) indicating the sidelink transmission, determine, based on the DCI, a data transmission subframe, among the resource pool, for transmitting sidelink data, and transmit, to another mobile device and in the determined data transmission subframe, the sidelink data.

The mobile device may receive, from the eNB, information of a resource reservation interval, determine, based on the determined data transmission subframe and the resource reservation interval, one or more transmission reservation subframes, and reserve a transmission of the sidelink data in the one or more transmission reservation subframes.

In TDD cell, the subframes other than uplink subframes may be Time Division Duplex (TDD) downlink subframes and TDD special subframes. The mobile device may receive, from the eNB, SLSS configuration information indicating the SLSS resource.

The mobile device may determine the period based on a system frame number (SFN) reset period or a direct frame number (DFN) reset period. For example, the period may be 10240 subframes because the SFN and DFN each has indexes from 0 to 1023, and each system frame or direct frame has ten subframes.

The mobile device may include one or more of: a vehicle-to-everything (V2X) device or a vehicle-to-vehicle (V2V) device. The resource pool for a sidelink transmission may correspond to one or more of: a resource pool for a V2X sidelink communication or a resource pool for a V2V sidelink communication.

The determining the second subset of subframes may include determining a quantity of the first subset of subframes, performing a modulo operation based on the quantity of the first subset of subframes and a quantity of bits in the bitmap, and determining the one or more subframes based on the modulo operation.

Further, a mobile device may perform a process of determining a resource pool for a sidelink transmission by: receiving, from an evolved NodeB (eNB), resource pool configuration information, the resource pool configuration information comprising a bitmap to determine the resource pool; determining, for a period having a plurality of Frequency Division Duplex (FDD) subframes, a first subset of subframes by excluding, from the plurality of FDD subframes, subframes in which a sidelink synchronization signal (SLSS) resource is configured; determining, for the period, a second subset of subframes by excluding, from the first subset of subframes, one or more subframes, wherein a quantity of the second subset of subframes corresponds to an integer multiple of a length of the bitmap; and determining, based on a plurality of repetitions of the bitmap, the resource pool for a sidelink transmission from the second subset of subframes.

Further, a mobile device may perform a process of determining a resource pool for a sidelink transmission by: receiving, from an evolved NodeB (eNB), resource pool configuration information, the resource pool configuration information comprising a bitmap to determine the resource pool; determining, for a period having a plurality of consecutive subframes, a first subset of subframes by excluding, from the plurality of consecutive subframes: subframes in which a sidelink synchronization signal (SLSS) resource is configured; and subframes other than uplink subframes; performing a modulo operation based on a quantity of the first subset of subframes and a length of the bitmap to determine one or more subframes to be excluded from the first subset of subframes; determining, for the period, a second subset of subframes by excluding, from the first subset of subframes, the one or more subframes, wherein a quantity of the second subset of subframes corresponds to an integer multiple of the length of the bitmap; and determining, based on a plurality of repetitions of the bitmap, the resource pool for a sidelink transmission from the second subset of subframes.

The above description is to explain the technical aspects of exemplary embodiments of the present invention, and it will be apparent to those skills in the art that modifications and variations can be made without departing from the spirit and scope of the present invention. Thus, it is intended that the present invention cover the modifications and variations of this invention provided they come within the scope of the appended claims and their equivalents.

What is claimed is:

1. A method of determining a resource pool for a sidelink transmission, the method comprising:
    receiving, at a mobile device and from an evolved NodeB (eNB), resource pool configuration information, the resource pool configuration information comprising a bitmap to determine the resource pool;
    determining, for a period having a plurality of consecutive subframes, a first subset of subframes by excluding, from the plurality of consecutive subframes:
        subframes in which a sidelink synchronization signal (SLSS) resource is configured; and
        subframes other than uplink subframes;
    determining, for the period, a second subset of subframes by excluding, from the first subset of subframes, one or more subframes, wherein a quantity of the second subset of subframes corresponds to an integer multiple of a length of the bitmap; and
    determining, based on a plurality of repetitions of the bitmap, the resource pool for a sidelink transmission from the second subset of subframes.

2. The method of claim 1, further comprising:
    receiving, at the mobile device and from the eNB, a downlink control information (DCI) indicating the sidelink transmission;
    determining, based on the DCI, a data transmission subframe, among the resource pool, for transmitting sidelink data; and
    transmitting, to another mobile device and in the determined data transmission subframe, the sidelink data.

3. The method of claim 2, further comprising:
    receiving, from the eNB, information of a resource reservation interval;
    determining, based on the determined data transmission subframe and the resource reservation interval, one or more transmission reservation subframes; and
    reserving a transmission of the sidelink data in the one or more transmission reservation subframes.

4. The method of claim 1, wherein the subframes other than uplink subframes are Time Division Duplex (TDD) downlink subframes and TDD special subframes.

5. The method of claim 1, further comprising receiving, at the mobile device and from the eNB, SLSS configuration information indicating the SLSS resource.

6. The method of claim 1, further comprising determining the period based on a system frame number (SFN) reset period or a direct frame number (DFN) reset period.

7. The method of claim 1, wherein the mobile device comprises one or more of: a vehicle-to-everything (V2X) device or a vehicle-to-vehicle (V2V) device, and wherein the resource pool for a sidelink transmission corresponds to one or more of: a resource pool for a V2X sidelink communication or a resource pool for a V2V sidelink communication.

8. The method of claim 1, wherein the determining the second subset of subframes comprises:
determining a quantity of the first subset of subframes;
performing a modulo operation based on the quantity of the first subset of subframes and a quantity of bits in the bitmap; and
determining the one or more subframes based on the modulo operation.

9. A method of determining a resource pool for a sidelink transmission, the method comprising:
receiving, at a mobile device and from an evolved NodeB (eNB), resource pool configuration information, the resource pool configuration information comprising a bitmap to determine the resource pool;
determining, for a period having a plurality of Frequency Division Duplex (FDD) subframes, a first subset of subframes by excluding, from the plurality of FDD subframes, subframes in which a sidelink synchronization signal (SLSS) resource is configured;
determining, for the period, a second subset of subframes by excluding, from the first subset of subframes, one or more subframes, wherein a quantity of the second subset of subframes corresponds to an integer multiple of a length of the bitmap; and
determining, based on a plurality of repetitions of the bitmap, the resource pool for a sidelink transmission from the second subset of subframes.

10. The method of claim 9, further comprising:
receiving, at the mobile device and from the eNB, a downlink control information (DCI) indicating the sidelink transmission;
determining, based on the DCI, a data transmission subframe, among the resource pool, for transmitting sidelink data; and
transmitting, to another mobile device and in the determined data transmission subframe, the sidelink data.

11. The method of claim 10, further comprising:
receiving, from the eNB, information of a resource reservation interval;
determining, based on the determined data transmission subframe and the resource reservation interval, one or more transmission reservation subframes; and
reserving a transmission of the sidelink data in the one or more transmission reservation subframes.

12. The method of claim 9, further comprising receiving, at the mobile device and from the eNB, SLSS configuration information indicating the SLSS resource.

13. The method of claim 9, further comprising determining the period based on a system frame number (SFN) reset period or a direct frame number (DFN) reset period.

14. The method of claim 9, wherein the mobile device comprises one or more of: a vehicle-to-everything (V2X) device or a vehicle-to-vehicle (V2V) device, and
wherein the resource pool for a sidelink transmission corresponds to one or more of: a resource pool for a V2X sidelink communication or a resource pool for a V2V sidelink communication.

15. The method of claim 9, wherein the determining the second subset of subframes comprises:
determining a quantity of the first subset of subframes;
performing a modulo operation based on the quantity of the first subset of subframes and a quantity of bits in the bitmap; and
determining the one or more subframes based on the modulo operation.

16. A method of determining a resource pool for a sidelink transmission, the method comprising:
receiving, at a mobile device and from an evolved NodeB (eNB), resource pool configuration information, the resource pool configuration information comprising a bitmap to determine the resource pool;
determining, for a period having a plurality of consecutive subframes, a first subset of subframes by excluding, from the plurality of consecutive subframes:
subframes in which a sidelink synchronization signal (SLSS) resource is configured; and
subframes other than uplink subframes;
performing a modulo operation based on a quantity of the first subset of subframes and a length of the bitmap to determine one or more subframes to be excluded from the first subset of subframes;
determining, for the period, a second subset of subframes by excluding, from the first subset of subframes, the one or more subframes, wherein a quantity of the second subset of subframes corresponds to an integer multiple of the length of the bitmap; and
determining, based on a plurality of repetitions of the bitmap, the resource pool for a sidelink transmission from the second subset of subframes.

17. The method of claim 16, wherein the subframes other than uplink subframes are Time Division Duplex (TDD) downlink subframes and TDD special subframes.

18. The method of claim 16, further comprising receiving, at the mobile device and from the eNB, SLSS configuration information indicating the SLSS resource.

19. The method of claim 16, further comprising determining the period based on a system frame number (SFN) reset period or a direct frame number (DFN) reset period.

20. The method of claim 16, wherein the mobile device comprises one or more of: a vehicle-to-everything (V2X) device or a vehicle-to-vehicle (V2V) device, and wherein the resource pool for a sidelink transmission corresponds to one or more of: a resource pool for a V2X sidelink communication or a resource pool for a V2V sidelink communication.

* * * * *